(12) United States Patent
Jain et al.

(10) Patent No.: US 11,281,760 B2
(45) Date of Patent: Mar. 22, 2022

(54) METHOD AND APPARATUS FOR PERFORMING USER AUTHENTICATION

(71) Applicant: SAMSUNG ELECTRONICS CO., LTD., Suwon-si (KR)

(72) Inventors: Arihant Jain, Rajasthan (IN); Ajay Sharma, Kurukshetra-Haryana (IN); Rahul Yadav, Alwar (IN); Kaushalendra Mishra, Bah Agra (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 219 days.

(21) Appl. No.: 16/515,815

(22) Filed: Jul. 18, 2019

(65) Prior Publication Data
US 2020/0026842 A1    Jan. 23, 2020

(30) Foreign Application Priority Data

Jul. 18, 2018 (IN) .............................. 201841026856
Jul. 1, 2019 (KR) ......................... 10-2019-0079001

(51) Int. Cl.
*G06F 21/00* (2013.01)
*G06F 21/36* (2013.01)

(52) U.S. Cl.
CPC ...... *G06F 21/36* (2013.01); *G06F 2221/2103* (2013.01)

(58) Field of Classification Search
CPC ............ G06F 21/36; G06F 2221/2103; G06F 21/316; G06F 2221/2133
See application file for complete search history.

(56) References Cited

U.S. PATENT DOCUMENTS

| 8,145,914 | B2 | 3/2012 | Steeves | |
|---|---|---|---|---|
| 9,223,950 | B2 | 12/2015 | Li et al. | |
| 9,639,699 | B1 | 5/2017 | Kurupati | |
| 9,654,477 | B1 * | 5/2017 | Kotamraju | H04L 63/102 |
| 10,691,785 | B1 * | 6/2020 | Budnitz | H04W 12/63 |
| 2007/0143624 | A1 * | 6/2007 | Steeves | G06F 21/10 |
| | | | | 713/182 |

(Continued)

FOREIGN PATENT DOCUMENTS

| EP | 2767953 A1 | 8/2014 |
|---|---|---|
| WO | 2016139655 A1 | 9/2016 |

OTHER PUBLICATIONS

International Search Report and Written Opinion (PCT/ISA/210 and PCT/ISA/237), dated Oct. 24, 2019 by International Searching Authority in International Application No. PCT/KR2019/008890.
Brad Yale "The CAPTCHA: A History, A Problem, Possible Solutions" Informit.com, Sep. 10, 2014, retrieved from [ http://www.informit.com/blogs/blog.aspx?uk=Why-Are-CAPTCHAs-So-Awful ], (8 pages total).

(Continued)

*Primary Examiner* — Jeffrey C Pwu
*Assistant Examiner* — William A Corum, Jr.
(74) *Attorney, Agent, or Firm* — Sughrue Mion, PLLC

(57) ABSTRACT

A method of authenticating a user includes obtaining a user authentication request for access to at least one application executed on an electronic device, identifying an actor and a task for authentication based on one or more context parameters associated with at least one of the electronic device or a user, providing a live challenge generated based on the identification, and identifying whether to access the at least one application based on whether the provided live challenge has been successfully performed.

16 Claims, 26 Drawing Sheets

(56) References Cited

U.S. PATENT DOCUMENTS

| | | | |
|---|---|---|---|
| 2010/0169958 A1* | 7/2010 | Werner | G06F 21/36 |
| | | | 726/6 |
| 2011/0197268 A1 | 8/2011 | Ravikumar et al. | |
| 2014/0111542 A1 | 4/2014 | Wan | |
| 2014/0250510 A1 | 9/2014 | Shuster | |
| 2014/0259130 A1* | 9/2014 | Li | H04L 63/0281 |
| | | | 726/6 |
| 2014/0282874 A1 | 9/2014 | Bennette | |
| 2015/0026796 A1* | 1/2015 | Alan | H04L 63/08 |
| | | | 726/19 |
| 2015/0339468 A1 | 11/2015 | Son et al. | |
| 2015/0339477 A1* | 11/2015 | Abrams | G06F 21/554 |
| | | | 726/23 |
| 2016/0210449 A1 | 7/2016 | Koch et al. | |
| 2017/0004656 A1 | 1/2017 | Raichelgauz et al. | |
| 2017/0318019 A1* | 11/2017 | Gordon | G06F 3/013 |
| 2017/0372056 A1 | 12/2017 | Narasimhan | |
| 2018/0060550 A1 | 3/2018 | Li et al. | |
| 2018/0109510 A1* | 4/2018 | Tommy | G06F 21/316 |
| 2018/0341779 A1* | 11/2018 | Sawant | H04L 63/08 |
| 2020/0134158 A1* | 4/2020 | Mullins | H04L 63/0884 |

OTHER PUBLICATIONS

Dave Neal "Security researcher breaks Google ReCaptcha with Google tools" The Inquirer, Mar. 2, 2017, retrieved from [ https://www.theinquirer.net/inquirer/news/3005704/security-researcher-breaks-google-recaptcha-with-google-tools ], (3 pages total).

Google "About reCAPTCHA", retrieved from [ https://support.google.com/recaptcha/?hl=en ], (9 pages total) (retrieved Jul. 18, 2019).

Bitcoin Forum "Google ReCaptcha problem", Simple Machines forum, Aug. 29, 2017, retrieved from [ https://bitcointalk.org/index.php?topic=2131834.0;all ], (7 pages total) (retrieved Jul. 18, 2019).

"I enter the correct verification number, but the form does not accept it. Why?", 123 Formbuilder, retrieved from [ https://www.123formbuilder.com/docs/i-enter-the-correct-verification-numberbut-the-form-does-not-accept-it-why/], (10 pages total) (retrieved Jul. 18, 2019).

Communication dated Apr. 16, 2021 issued by the European Intellectual Property Office in counterpart European Application No. 19836976.1.

* cited by examiner

METHOD AND APPARATUS FOR PERFORMING USER AUTHENTICATION

CROSS-REFERENCE TO RELATED APPLICATIONS

This application claims the benefit of Indian Patent Application No. 201841026856, filed on Jul. 18, 2018, in the Indian Patent Office and Korean Patent Application No. 10-2019-0079001, filed on Jul. 1, 2019, in the Korean Intellectual Property Office, the disclosures of which are incorporated herein in their entirety by reference.

BACKGROUND

1. Field

The disclosure relates to a user authentication technology. More particularly, the disclosure relates to a method and an apparatus for performing user authentication by providing a live challenge generated based on context parameters associated with a user of an electronic device.

2. Description of Related Art

As digital communication technologies are dramatically developed in various types of electronic devices, there is a growing concern about maintaining data security. In electronic devices, data security is required to protect the access, use, disclosure, modification, and destruction of information about unauthorized individuals and entities.

In general, in order to access limited features of electronic devices, such as particular programs, applications, data, or websites, a message for prompting a password may be displayed so that a user is allowed to be authorized with respect to the limited features. In addition, there are several methods of identifying and/or authenticating users of electronic devices. Authentication may include, for example, personal identification number (PIN)-based authentication, pattern-lock-based authentication, Completely Automated Public Turing test to tell Computers and Humans Apart (CAPTCHA)-based authentication, biometric (fingerprint recognition, face recognition, or iris recognition)-based authentication, and the like. FIG. 1A is a diagram illustrating examples of authentication types according to the related art.

Existing user authentication methods are incompatible and cumbersome. For example, in the case of the existing method, when a user wants to access an application or a website of an electronic device, a user is identified as not being a web robot (that is, a BOT) by using CAPTCHA or RE-CAPTCHA and authority to access is granted to the user. The user may access the application or the website after solving a challenge (for example, a captcha 10, a pattern 20, or a question) as illustrated in FIG. 1A. According to the method illustrated in FIG. 1A, it is possible to prevent a BOT from using an application or a website. However, because the challenge problem is already generated and stored in the electronic device, a non-interactive authentication method is performed.

Therefore, there is a need for more useful alternative technologies to overcome the aforementioned disadvantages or other disadvantages in authentication.

SUMMARY

According to an embodiment of the disclosure, a live challenge may be generated based on context parameters associated with a user of an electronic device, and user authentication may be performed based on the live challenge. According to another embodiment of the disclosure, user authentication may be performed by recognizing an object around an electronic device and providing a live challenge generated based on the object in an augmented reality (AR) mode.

Additional aspects will be set forth in part in the description which follows and, in part, will be apparent from the description, or may be learned by practice of the presented embodiments of the disclosure.

According to an embodiment of the disclosure, a method of authenticating a user may include: receiving a user authentication request for access to at least one application executed on an electronic device; identifying an actor and a task constituting a live challenge for authentication based on context parameters associated with at least one of the electronic device or a user; providing the live challenge generated based on the identifying; and identifying whether to access the at least one application based on whether to perform the provided live challenge. In another embodiment of the disclosure, a method of authenticating a user may include: receiving a user authentication request for access to at least one application executed on an electronic device; identifying an actor and a task based on one or more context parameters associated with at least one of the electronic device or a user; generating a live challenge for authentication based on the identified actor and task; providing the generated live challenge to the user or the electronic device; and identifying whether to grant access to the at least one application based on whether the provided live challenge has been performed. The actor and the task may constitute the live challenge.

The method may further include identifying an object displayed in a field of view (FoV) of a camera provided in the electronic device, wherein the identifying of the actor and the task may include identifying the actor and the task based on the identified object and the one or more context parameters.

The identifying of the actor and the task may include: identifying an actor corresponding to the identified object; and identifying a task capable of being performed by the identified actor, and the providing of the live challenge may include displaying a question prompting the identified task.

The providing of the live challenge may include, when an augmented reality (AR) mode is set in the electronic device, outputting an AR image of the live challenge constituted by the actor and the task on the identified object in a superimposing manner.

The method may further include identifying movement information about the electronic device or the user after object identification, wherein the outputting of the AR image may include adjusting a location at which the AR image is output, based on the identified movement information.

The method may further include: identifying a location of the electronic device; and identifying an object around the electronic device based on the identified location of the electronic device, wherein the identifying of the actor and the task may include identifying the actor and the task based on the identified object and the one or more context parameters.

The identifying of whether to access the at least one application may include: based on the user's action corresponding to the live challenge not being identified within a predetermined time, denying the access to the at least one application; and based on the user's action corresponding to the live challenge being identified within the predetermined time, permitting the access to the at least one application.

For example, the identifying of whether to access the at least one application may include: when the user's action corresponding to the live challenge is not identified within a predetermined time, denying the access to the at least one application; and when the user's action corresponding to the live challenge is identified within the predetermined time, permitting the access to the at least one application.

The one or more context parameters may include at least one of setting information about the electronic device, time information, a location at which the user authentication request has been obtained, an activity performed in the electronic device by the user, a notification obtained by the electronic device, social network service (SNS) information, surrounding environment information about the electronic device, a network to which the electronic device is connected, or the number of other electronic devices connected to the electronic device.

The identifying of the actor and the task may include identifying the actor and the task by using a preset learning network model based on the one or more context parameters.

According to another embodiment of the disclosure, an electronic device for performing user authentication may include: an inputter/outputter; a memory storing instructions; and at least one processor connected to the memory, wherein the at least one processor is configured to execute the instructions to: obtain a user authentication request for access to at least one application executed on an electronic device via the inputter/outputter; identify an actor and a task constituting a live challenge for authentication based on one or more context parameters associated with at least one of the electronic device or a user; provide the live challenge generated based on the identifying via the inputter/outputter; and identify whether to access the at least one application based on whether to perform the provided live challenge. The inputter/outputter may, for example, be a touch screen display that can obtain input information (touch input) and display (output) information. According to another embodiment of the disclosure, at least one processor may be configured to execute instructions to: obtain a user authentication request for access to at least one application executed on an electronic device via the inputter/outputter; identify an actor and a task based on one or more context parameters associated with at least one of the electronic device or a user; generate a live challenge for authentication based on the identified actor and task; provide the generated live challenge to the user of the electronic device; and identify whether to grant access to the at least one application based on whether the provided live challenge has been performed.

According to another embodiment of the disclosure, a computer program product may include a computer-readable recording medium, such as, a non-transitory computer-readable storage medium that stores computer program code which, when executed by a processor, causes the processor to perform a process comprising: receiving a user authentication request for access to at least one application executed on an electronic device; determining an actor and a task based on one or more context parameters associated with at least one of the electronic device or a user; generating a live challenge for authentication based on the determined actor and task; providing the generated live challenge to the user or the electronic device; and determining whether to grant access to the at least one application based on whether the provided live challenge has been performed.

According to another embodiment of the disclosure, a computer program product comprising a computer readable storage medium having a computer readable program stored therein, wherein the computer readable program, when executed on a computing device, causes the computing device to: obtain a user authentication request for access to at least one application executed on an electronic device; identify an actor and a task constituting a live challenge for authentication based on context parameters associated with at least one of the electronic device or a user; providing the live challenge generated based on the determination; and identify whether to access the at least one application based on whether to perform the provided live challenge.

According to another embodiment of the disclosure, a method of authenticating a user may comprise: receiving a user authentication request that requests access to at least one application executed on an electronic device; based on the obtained user authentication request, automatically control a camera to capture an image or automatically control a sensor to obtain current user context information; determining a live augmented reality (AR) challenge for authentication based on an object recognized in the captured image or based on the current user context information; generating an AR image based on the determined live challenge; displaying the generated AR image; determining whether a user performs an action corresponding to the live AR challenge; and based on determining that the user performs the action corresponding to the live AR challenge, grant access to the at least one application. The method may also include that the AR image includes at least one of: information regarding a question asked to a user of the electronic device and imagery associated with an action to be performed by the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
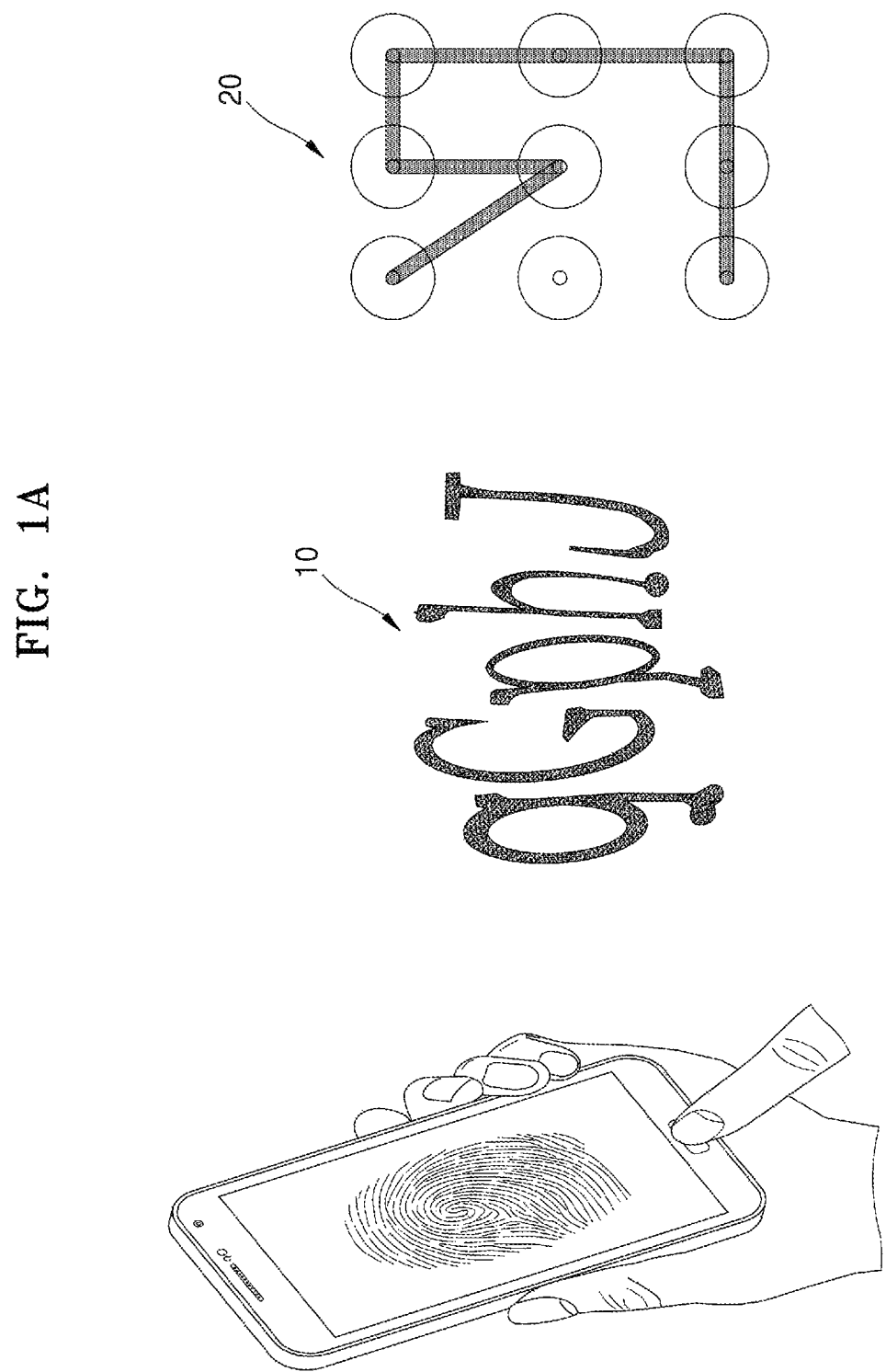
FIG. 1A is a diagram illustrating examples of authentication types according to the related art.

The terms used herein will be briefly described and a user authentication technology according to an embodiment of the disclosure will be described in detail.

The terms used herein are those general terms currently widely used in the art in consideration of functions in regard to the user authentication technology, but the terms may vary according to the intention of those of ordinary skill in the art, precedents, or new technology in the art. Moreover, specified terms may be selected by the applicant, and in this case, the detailed meaning thereof will be described in the detailed description of the disclosure. Thus, the terms used herein should be understood not as simple names but based on the meaning of the terms and the overall description of the disclosure.

It will be understood that, although the terms "first", "second", etc. may be used herein to describe various elements, these elements should not be limited by these terms. These terms are only used to distinguish one component from another. For example, a first component may be referred to as a second component, and similarly, a second component may also be referred to as a first component, without departing from the scope of the user authentication technology according to the embodiment of the disclosure. The term "and/or" includes any combination of a plurality of related items or any of a plurality of related items.

Throughout the disclosure, the expression "at least one of a, b or c" indicates only a, only b, only c, both a and b, both a and c, both b and c, all of a, b, and c, or variations thereof. Similarly, the expression "at least one of a, b and c" indicates only a, only b, only c, both a and b, both a and c, both b and c, all of a, b, and c, or variations thereof It will be understood that terms such as "comprise", "include", and "have", when used herein, specify the presence of stated elements, but do not preclude the presence or addition of one or more other elements. In addition, the term "unit" used in the specification refers to software or a hardware component such as field programmable gate array (FPGA) or application specific integrated circuit (ASIC), and a "unit" performs certain functions. However, the "unit" is not limited to software or hardware. The "unit" may be configured in an addressable storage medium or configured to reproduce one or more processors. Thus, for example, the "unit" includes components such as software components, object-oriented software components, class components, task components, processes, functions, attributes, procedures, subroutines, segments of programs codes, drivers, firmware, microcodes, circuits, data, databases, data structures, tables, arrays, and variables. Functions provided in the components and the "units" may be combined with a smaller number of components and "units" or may be separated from additional components and "units."

Hereinafter, embodiments of the disclosure will be described in detail with reference to the accompanying drawings so that those of ordinary skill in the art can easily carry out the disclosure. However, the user authentication technology according to the embodiment of the disclosure may be embodied in many different forms and is not limited to the embodiments of the disclosure described herein. In order to clearly describe the user authentication technology according to the embodiment of the disclosure, parts having no relation to the description are omitted, and like reference numerals are assigned to like elements throughout the specification.

According to an existing user authentication technology, user authentication may be performed by prompting a user to provide a password, a pattern, a Completely Automated Public Turing test to tell Computers and Humans Apart (CAPTCHA), biometric information, or the like on an electronic device. In addition, the electronic device may determine whether to authenticate the user, based on whether the password input from the user matches the already stored data. In addition to the password, biometric information may be used for user authentication. For example, the user may perform authentication by providing a fingerprint to a smartphone. As described above, the existing user authentication technology is not interactive, and it may be difficult for the user to remember information (password, pattern, or the like) necessary for the credential each time. Thus, the user may feel uncomfortable.

Unlike the existing user authentication technology, the user authentication technology according to the embodiment of the disclosure may perform user authentication in an interactive manner. An electronic device that performs a user authentication method, according to an embodiment of the disclosure, may generate a live augmented reality (AR) challenge based on a plurality of context parameters. The generated live AR challenge may be displayed on a screen of the electronic device that operates in an AR mode. The electronic device may display the live AR challenge to guide the user to perform at least one task in real time. When the user successfully completes the task, the user may access the electronic device. Therefore, the electronic device according to the embodiment of the disclosure may perform authentication through interaction with the user by confirming whether the task is performed according to the live AR challenge in real time.

In addition, the user authentication technology according to the embodiment of the disclosure may generate the live challenge based on user behavior. For example, the electronic device may identify whether an authentication requester is a BOT or a user of an electronic device (that is, an actual user) by providing a live challenge based on a question, such as, the question "Who is calling every day?"

In addition, the user authentication technology according to the embodiment of the disclosure may generate a real-time live AR challenge without using external hardware components.

Hereinafter, the embodiment of the disclosure will be described in more detail with reference to FIGS. 1B to 21.

Figure 1B:
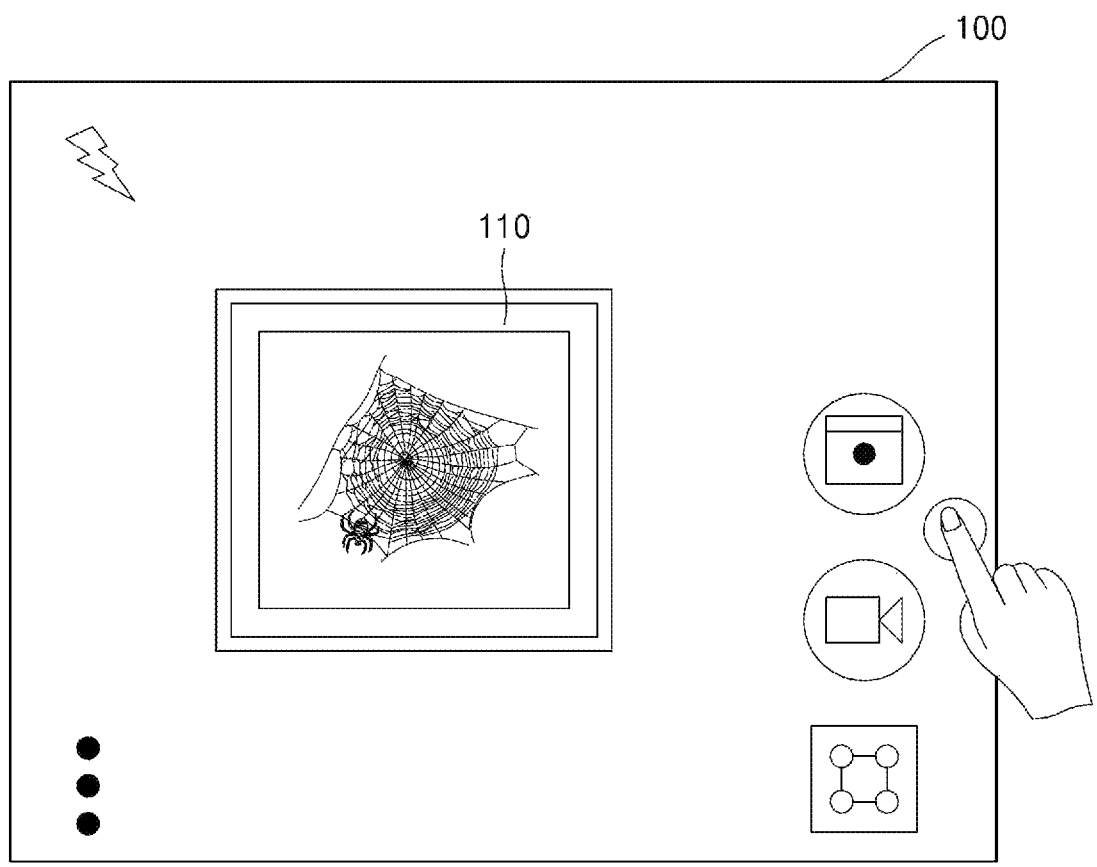
FIG. 1B is a diagram for describing a method of performing user authentication, according to an embodiment of the disclosure.

FIG. 1B is a diagram for describing a method of performing user authentication according to an embodiment of the disclosure.

Referring to FIG. 1B, the electronic device 100 may receive, from a user, a user authentication request for access to at least one application. For example, when a user input of touching an icon indicating one of at least one application requiring authority to access is identified, the electronic device 100 may determine that a user authentication request has been received. However, this is only an example, and the method by which the electronic device 100 receives the user authentication request is not limited to the above-described example.

The electronic device 100 according to the embodiment of the disclosure may automatically operate a camera function to capture an image of a region around the user in response to the reception of the user authentication request. The camera captures an image of an object around the user and displays the captured image in the field of view of the camera. Therefore, the object around the user may be identified. For example, the electronic device 100 may identify a window around the user (e.g., a window behind or in front of the user) through the captured image of the region around the user.

In addition, the electronic device 100 according to the embodiment of the disclosure may determine a plurality of context parameters associated with at least one of the user or the electronic device 100. The context parameters may include at least one of setting information about the electronic device, the time and location at which the user authentication request has been received, an activity performed in the electronic device by the user, a notification received by the electronic device, social network service (SNS) information, surrounding environment information about the electronic device, a network to which the electronic device is connected, or the number of other electronic devices connected to the electronic device. For example, the electronic device 100 may determine whether information, such as, information that indicates that it is currently raining.

The electronic device 100 may determine a real-time story based on the recognized object, such as the window, and the context parameters. The recognized object may be recognized by performing image recognition and/or pattern matching.

In addition, the electronic device 100 may select at least one task to be applied to the real-time story. In addition, the electronic device 100 may determine that at least one task needs to be applied to at least one actor. The task may be "killing a spider." In addition, the electronic device 100 may generate a live challenge by combining a real-time story, at least one actor, and at least one task. For example, the live AR challenge illustrated in FIG. 1B may be generated by augmenting a spider, which is a virtual AR image, in a window recognized by the electronic device 100. The live AR challenge may be generated by using at least one of AR technology, virtual reality (VR) technology, or the like. The electronic device 100 may display the live challenge to the user in the AR mode and may guide the user to perform, for example, an interactive task such as task 110 "spider killing." In addition, the user may kill the spider by performing the touch operation on the spider to complete the requested task. When the user successfully performs the task, the electronic device 100 may permit the user access. When the user does not successfully perform the task, the electronic device 100 may deny the access.

According to another example, when the time at which the window is recognized by the electronic device 100 is the morning time, the live AR challenge may be "open the window" for ventilation. According to another example, when the time at which the window is recognized by the electronic device 100 is the evening time, the live AR challenge may be "close the window." The live AR challenge may be generated in real time based on context parameters indicating at least one of user behavior, user environment, or the like. Therefore, mutual user authentication may be performed.

Figure 2:
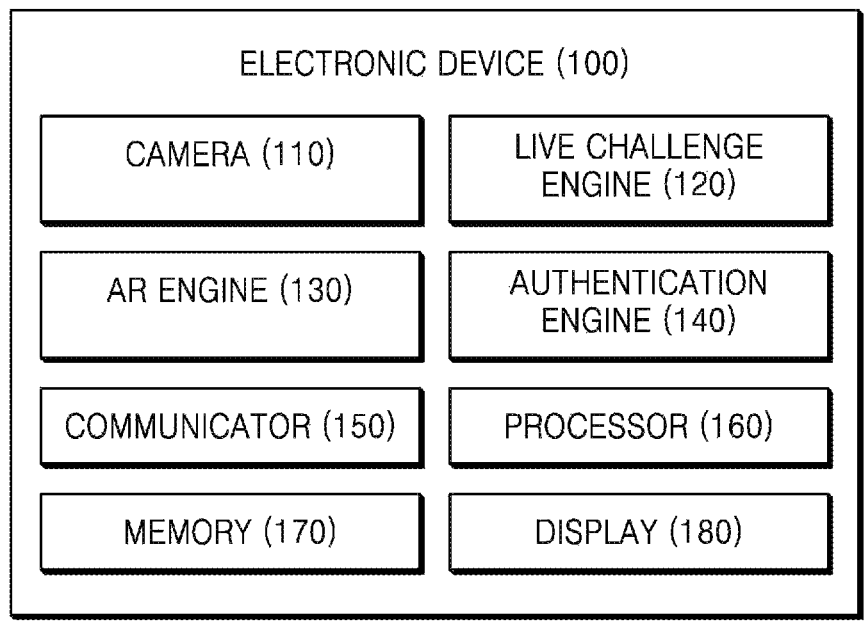
FIG. 2 is a block diagram of an electronic device according to an embodiment of the disclosure.

FIG. 2 is a block diagram of the electronic device 100 according to the embodiment of the disclosure.

Referring to FIG. 2, the electronic device 100 may include a camera 110, a live challenge engine 120, an AR engine 130, an authentication engine 140, a communicator 150, a processor 160, a memory 170, and a display 180. However, this is only an example, and the electronic device 100 may include fewer or more components than the above-described components. For example, the electronic device 100 may further include one or more sensors, such as a gyroscope, a GPS sensor and/or an acceleration sensor, which is capable of identifying the location or movement of the user or the electronic device 100. The above-described sensor is only an example, and the sensor included in the electronic device 100 is not limited to the above-described example.

The live challenge engine 120 according to the embodiment of the disclosure may receive a user authentication request to authenticate that the user is the user of the electronic device 100. When the user authentication request is received, the live challenge engine 120 may generate a live challenge for the user of the electronic device 100. The live challenge may indicate a real-time story and may include at least one task to be performed by the user.

In the embodiment of the disclosure, when the user authentication request is received, the live challenge engine 120 may generate a live challenge for the user by automatically starting the camera 110. The camera 110 may be an imaging sensor or the like and may be used to capture an image of a region around the user. In addition, the live challenge engine 120 may recognize an object around the user displayed in the FoV of the camera 110.

In addition, the live challenge engine 120 may determine a plurality of context parameters associated with at least one of the user or the electronic device 100. In the embodiment of the disclosure, the context parameters may include at least one of setting information about the electronic device, the time (for example, the current date and time), a location at which the user authentication request has been received, an activity performed in the electronic device by the user, a notification received by the electronic device, SNS information, surrounding environment information (for example, weather information or illumination information) of the electronic device, a network to which the electronic device is connected, or the number of other electronic devices connected to the electronic device.

In addition, the live challenge engine 120 may determine a real-time story based on the recognized object, such as the window, and the context parameters. The live challenge engine 120 may determine at least one actor based on the real-time story. The live challenge engine 120 may determine at least one task to be applied to at least one actor. In addition, the live challenge engine 120 may generate a live challenge by combining a real-time story, at least one actor, and at least one task. At this time, the live challenge may include a live AR challenge. The live AR challenge may be generated by augmenting a live view with an AR image (e.g., a spider), which may indicate to the actor the task to be performed related to the recognized object, and this AR image may be provided when the electronic device 100 operates in the AR mode.

According to the embodiment of the disclosure, the authentication engine 140 may be connected to the memory 170 and the processor 160. The authentication engine 140 may perform user authentication based on the live AR challenge. The AR engine 130 may display the live AR challenge in the AR mode on the screen of electronic device 100. In addition, the AR engine 130 may derive at least one task to be performed by the user in the AR mode. The authentication engine 140 may determine whether at least one task is successfully performed by the user in the AR mode. In addition, when at least one task is successfully performed by the user, the authentication engine 140 may authorize the user access to at least one application of the electronic device 100.

According to another embodiment of the disclosure, the electronic device 100 may identify the object around the user without using the camera 110. The electronic device 100 may determine whether the location of the user is inside by using a global positioning system (GPS) sensor, a gyroscope, or any other sensor, and may recognize the object based on the location of the user. For example, when the electronic device 100 determines that the user is in his or her bedroom, the electronic device 100 may fetch data for the particular location (such as the bedroom) and recognize the object existing in the particular location so as to generate the live challenge based on the fetched data. The fetched data may be, for example, a captured image of the particular location. However, this is merely an example, and the data is not limited thereto.

According to another embodiment of the disclosure, the electronic device 100 may generate the live challenge without using the camera, the AR, the VR, and the like. The electronic device 100 may dynamically generate the live challenge based on the context parameters (such as current user behavior). For example, the location of the user may be determined as an office based on the coordinates of the electronic device 100 acquired by using the GPS or the like. Therefore, the electronic device 100 may determine an object existing in the office, determine an actor and a task based on the determined object, and generate a live challenge. For example, the electronic device 100 may request the user to select a color of a water bottle on a user's desk.

The communicator 150 may be a communication interface that is configured so that the hardware components in the electronic device 100 internally communicate with each other. The communicator 150 may be further configured so that the electronic device can communicate with other electronic devices and or a server.

The processor 160 may be connected to the memory 170 to process various instructions stored in the memory 170 so as to authenticate the user of the electronic device 100.

The memory 170 may store instructions to be executed by processor 160. The memory 170 may include non-volatile storage elements. Examples of the non-volatile storage elements may include magnetic hard disks, optical disks, floppy disks, flash memory, or electrically programmable memory (EPROM), or electrically erasable programmable memory (EEPROM). In addition, the memory 170 may be considered as a non-transitory storage medium in some examples. The term "non-transitory" indicates that the storage medium is not implemented by a carrier wave or a propagated signal. However, the term "non-transitory" should not be construed as meaning that the memory 170 is immovable. In some examples, the memory 170 may be configured to store more information than the memory. In certain examples, the non-transitory storage medium may store data that may change over time (for example, in random access memory (RAM) or cache).

In the embodiment of the disclosure, the display 180 may be configured to display content on the electronic device 100. Examples of the display 180 may include a liquid crystal display (LCD), an active matrix organic light-emitting diode (AM-OLED) display, a light-emitting diode (LED) display, or the like.

Although FIG. 2 illustrates various hardware components of the electronic device 100, the configuration of the electronic device 100 according to the embodiment of the disclosure is not limited thereto. In another embodiment of the disclosure, the electronic device 100 may include fewer or more components. In addition, the label or name of each component is used for illustrative purposes only and is not intended to limit the scope of the disclosure. One or more components may be connected together to perform the same or substantially similar function of authenticating the user of electronic device 100.

The electronic device 100 may be one of a smartphone, a mobile phone, a laptop, a tablet, a phablet, or the like, but is not limited thereto.

Figure 3:
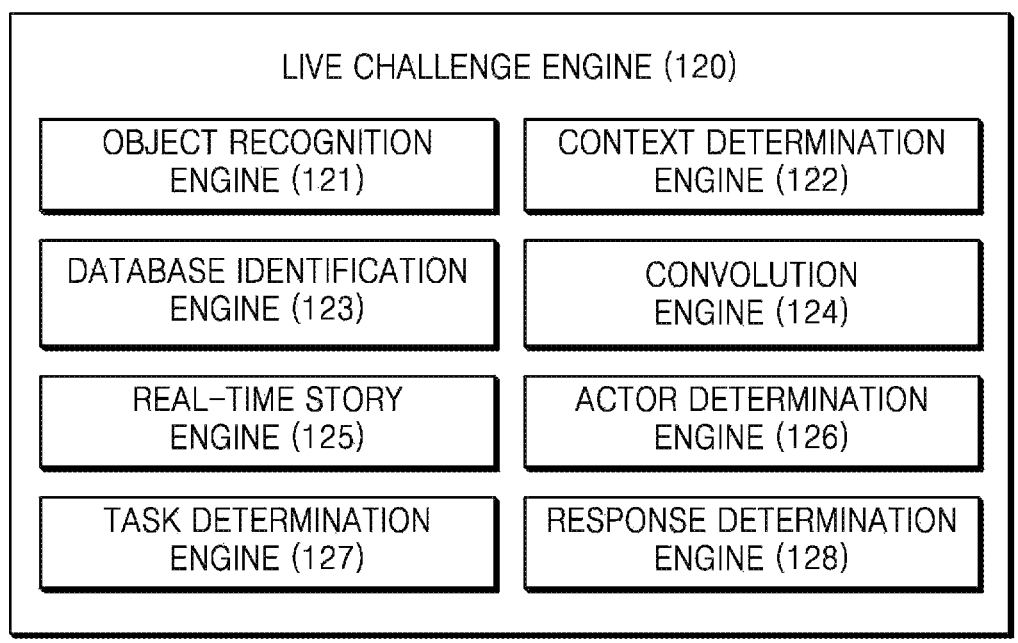
FIG. 3 is a block diagram illustrating a live challenge engine of an electronic device, according to an embodiment of the disclosure.

FIG. 3 is a block diagram illustrating the live challenge engine 120 of the electronic device 100, according to an embodiment of the disclosure.

Referring to FIG. 3, the live challenge engine 120 may include an object recognition engine 121, a context determination engine 122, a database identification engine 123, a convolution engine 124, a real-time story engine 125, an actor determination engine 126, a task determination engine 127, and a response determination engine 128.

In the embodiment of the disclosure, when the user authentication request is received, the live challenge engine 120 may automatically start the camera 110 of the electronic device 100. In addition, the object recognition engine 121 may recognize the object around the user, which is displayed in the FoV of the camera 110. According to another example, the object recognition engine 121 may determine the object existing around the user based on a sensor capable of determining a location. Examples of the sensor may include a GPS sensor provided in the electronic device 100.

In addition, the context determination engine 122 may determine a plurality of context parameters associated with at least one of the user or the electronic device. In addition, the real-time story engine 125 may determine a real-time story based on the recognized object and the context parameters.

The actor determination engine 126 may determine at least one actor based on the real-time story. The database identification engine 123 may be configured to identify and select a user story from a database. In addition, the database identification engine 123 may be configured to identify or select an actor group for the user story from the database. The task determination engine 127 may determine at least one task to be applied to at least one actor.

The convolution engine 124 may combine the real-time story, at least one actor, and at least one task to generate a live challenge. The live challenge engine 120 may receive the live challenge from the convolution engine 124.

The task determination engine 127 may guide or prompt the user to perform at least one task determined in real time.

The response determination engine 128 may determine whether at least one task is successfully performed by the user.

The live challenge engine 120 according to another embodiment of the disclosure may generate the live challenge for the user without using the camera 110. This may correspond to the same embodiment described above with reference to FIG. 2.

Figure 4:
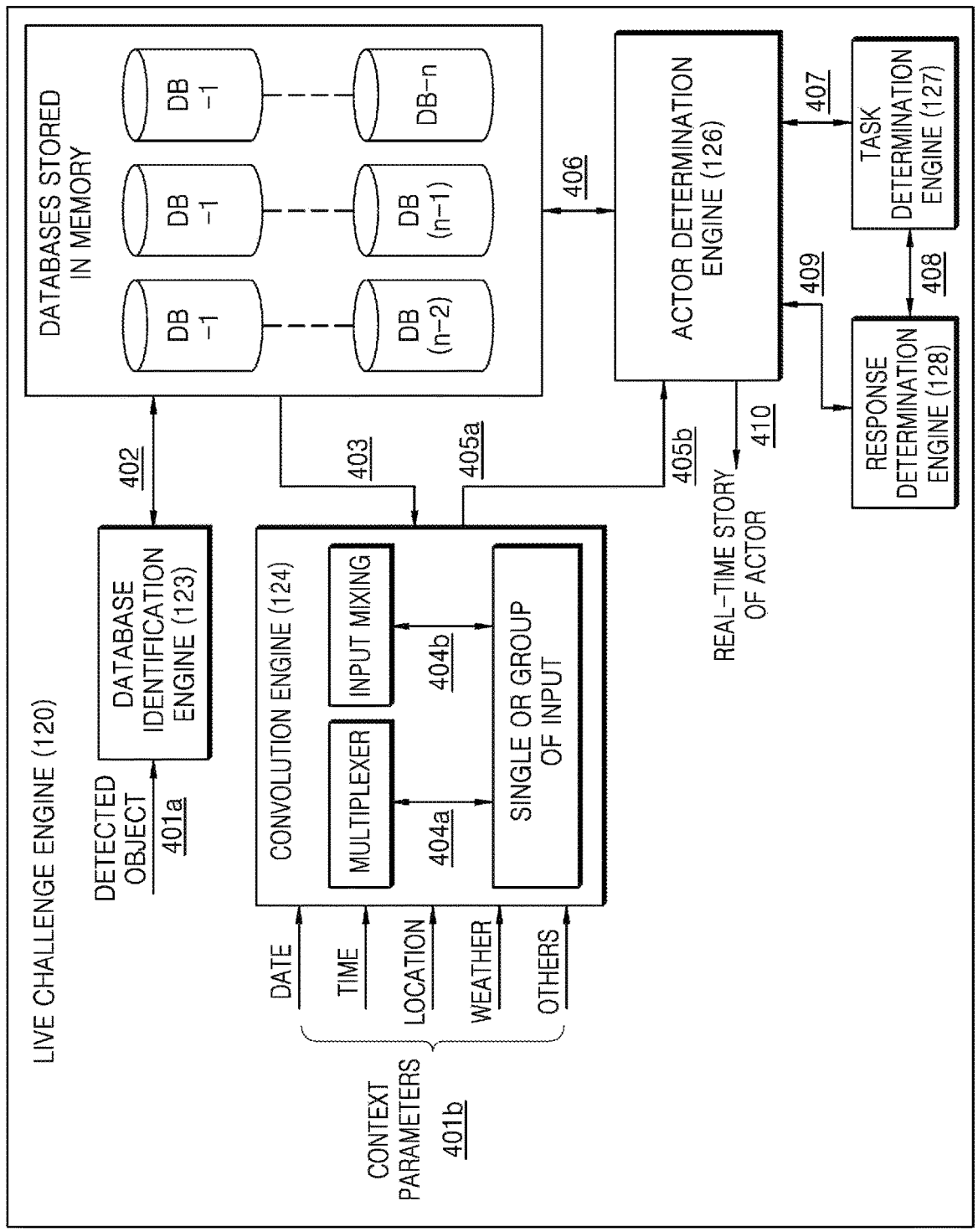
FIG. 4 is a diagram illustrating a process of a live challenge engine for generating a live challenge, according to an embodiment of the disclosure.

FIG. 4 is a diagram illustrating a process of the live challenge engine 120 for generating the live challenge, according to an embodiment of the disclosure.

Referring to FIG. 4, the following process may be performed by the live challenge engine 120 of the electronic device 100 so as to generate the live challenge for the user of the electronic device 100.

In operation 401a, the live challenge engine 120 may transmit the detected object to the database identification engine 123. The object may be detected by, for example, an intelligent agent that recognizes and classifies objects (e.g., Bixby vision). The intelligent agent may recognize and classify objects by performing image recognition on an object included in an image captured by the camera.

In operation 401b, the live challenge engine 120 may transmit a plurality of context parameters to the convolution engine 124. The context parameters may include one or more of: a current date, a current time, a current location, difficulty of the live challenge, weather information, an illumination condition of the user's current environment, speed information at which the user or the electronic device 100 moves, scenery information (e.g., an image of scenery), a portrait, a direction (for example, reverse or forward direction) of the electronic device 100, seasonal information (for example, an indication of the current season such as spring, summer, autumn, or winter), the number or type of accessories connected to the electronic device 100, setting information (for example, sound on/off, power saving on/off), or the like.

In operation 402, the live challenge engine 120 may select any one of a plurality of databases stored in the memory 170.

In operation 403, the live challenge engine 120 may transmit the selected database and the number of entries to the convolution engine 124.

In operations 404a and 404b, the convolution engine 124 may mix one, more than one, or all of the context parameters and the received number of entries into the database and generate, (e.g., every time), a unique value by using, for example, hashing technologies and/or random number generation technologies.

In operations 405a and 405b, the convolution engine 124 may transmit the generated values to the database stored in the memory 170. Meanwhile, the live challenge engine 120 may transmit the generated value to the actor determination engine 126.

In operation 406, when the generated value is received, the live challenge engine 120 may select a user story from the database stored in memory 170. In addition, the actor determination engine 126 may transmit the user story to the task determination engine 127.

In operation 407, the task determination engine 127 may determine the questions or tasks to be displayed to the user. The task determination engine 127 may store a list of tasks that may be performed for each type of the actor and the recognized object. In addition, the task determination engine 127 may be trained by using a learning network model based on some training data sets of inputs and outputs. For example, the actor and the object may be used as the input, and the question may be used as the output. Therefore, the task determination engine 127 may identify a set of questions that may be presented for the current scenario, based on the actor and the object. The task determination engine 127 may determine the question based on the current user environment such as a location or a timer. For example, when the user views a movie, the task determination engine 127 may determine the question to be a question that prompts the user to input information about who a movie actor is.

In operation 408, when the question or activity is determined, the task determination engine 127 may transmit the determined question or activity to the response determination engine 128.

In operation 409, the response determination engine 128 may determine an accurate answer to the question and transmit the determined accurate answer to the actor determination engine 126.

In operation 410, the actor determination engine 126 may select characteristics (for examples, size, shape, color, or user story) of the actor, based on the inputs such as the user story, the difficulty for the live challenge, and the context parameters.

For example, an example scenario showing that a "window is displayed and the window has a curtain" may be assumed as the user history. The context parameters for the current usage environment may be as follows:

a. Current location of user (for example, state or country)
   b. Current weather condition (for example, sunny, rainy, or the like)
   c. Current time (for example, daytime, night, afternoon, or the like)
   d. Difficulty value (for example, difficult, easy, or medium).

For example, the current usage environment may include information that indicates that the user is in India, the weather is clear, it is daytime, and the difficulty is easy. Based on this current usage environment information, the actor determination engine 126 may display the window with the opened curtain (easy in the degree of difficulty), and the user may be requested to close the curtain because the weather is clear (and, for example, it is very sunny).

For user authentication, a background service may be continuously executed in the electronic device 100 to capture user behavior and generate and store a database of a live challenge and a solution to the live challenge from the captured user behavior. In order to generate the live challenge, it may be necessary to activate one or more of the following types of functions:

a. messaging
b. email
c. Location
d. Telephone
e. General activities [for example, schedule information, health record, or the like]
f. User trend [for example, camera usage, call usage, frequent calls, and home-office routines]

Figure 5:
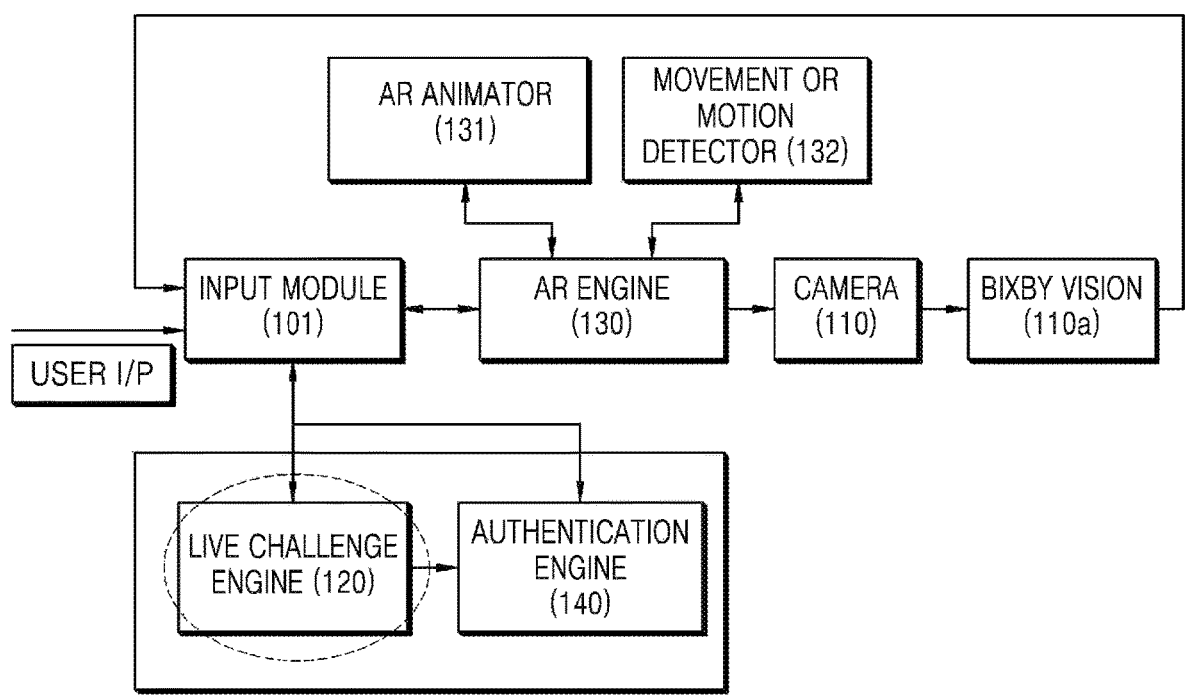
FIG. 5 is a diagram for describing a method of authenticating a user of an electronic device, according to an embodiment of the disclosure.

FIG. 5 is a diagram for describing a method of authenticating a user of an electronic device 100, according to an embodiment of the disclosure.

In the following procedure, an embodiment of the disclosure in which the AR engine 130 of the electronic device 100 is involved in user authentication will be described.

1) An input module 101 of the electronic device 100 may receive a user authentication request.

2) The user authentication request may be transmitted to the AR engine 130.

3) The AR engine 130 may also operate a camera 110 of the electronic device 100.

4) The camera 110 may transmit an image to an intelligent agent, such as, Bixby vision agent 110a of the electronic device 100. The Bixby vision agent 110a may be built inside the camera 110 so that the user may tap a visual icon in a viewfinder so as to interpret a sign or construct an AR image.

5) The Bixby vision agent 110a may identify an object in the FoV of the user and transmit the identified object to the input module 101.

6) The input module 101 may transmit the identified object to the live challenge engine 120.

7) The live challenge engine 120 may generate a live AR challenge by augmenting a user's FoV with an AR image related to a user story and an actor. The live AR challenge may be generated based on the identified object and other context parameters. In addition, the live challenge engine 120 may transmit the live AR challenge to the input module 101. In addition, the live challenge engine 120 may transmit the result of the live AR challenge to an authentication engine 140.

8) The input module 101 may transmit the live AR challenge and the context parameters to the AR engine 130.

9) The AR engine 130 may display the live challenge in the AR mode via the camera 110. An AR animator 131 may be configured to display the live challenge or the AR image associated with the live challenge at a particular location on the display 180 of the electronic device 100. The AR engine 130 may also operate a movement or motion detector 132 so as to acquire movement information about the user and the electronic device 100.

10) The movement or motion detector 132 may continue to transmit movement information to the AR engine 130.

11) The AR engine 130 may transmit the movement information to the input module 101. The input module 101 may identify whether the live AR challenge has been successfully completed based on the movement information.

12) The input module 101 may also transmit the authentication result to the authentication engine 140. In order to determine whether the live AR challenge has been successfully completed, the authentication engine 140 may determine an association between the result received from the live challenge engine 120 and the result received from the input module 101.

a. When the result received from the input module 101 and the result received from the live challenge engine 120 are the same, the challenge may be successfully completed. Therefore, the authentication engine 140 may permit the user access to the electronic device 100.

b. When the result received from the input module 101 and the result received from the live challenge engine 120 are not the same, the live challenge may not be successfully completed. Therefore, the authentication engine 140 may deny the user access to the electronic device 100.

Figure 6:
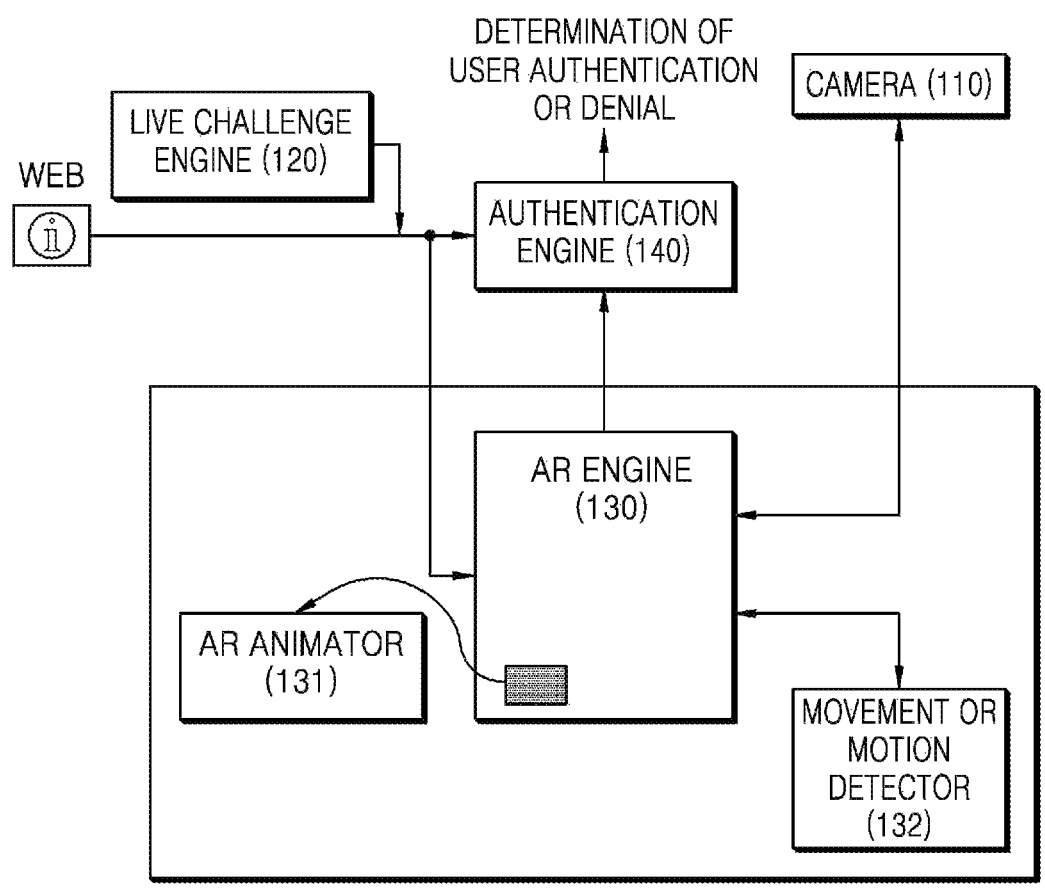
FIG. 6 is a block diagram of an authentication engine of an electronic device for authenticating a user, according to an embodiment of the disclosure.

FIG. 6 is a block diagram of the authentication engine 140 of the electronic device 100 for authenticating a user, according to an embodiment of the disclosure.

A live challenge engine 120 may generate a live challenge and transmit relevant information to an AR engine 130 to provide a live challenge interactively with the camera 110. The AR engine 130 may include an AR animator 131 and a movement or motion detector 132, which may be a sensor. The AR engine 130 may perform an analysis of when, where, and how to present the live challenge.

The AR animator 131 may analyze data of the live challenge and determine where to display the live challenge in the electronic device 100. The AR animator 131 may calculate an accurate position at which the AR image of the live challenge is displayed, based on parameters provided by the live challenge. The AR animator 131 may display the live challenge in the AR mode of the display at the location determined based on the calculation. In addition, the AR engine 130 may interact with the movement or motion detector 132 to receive a user input and transmit the user input to the authentication engine 140. The movement or motion detector 132 may use a sensor such as a gyroscope or an accelerometer to detect the movement of the electronic device 100 and identify whether the user is in the correct state or three-dimensional (3D) space.

The following procedure may be performed by the AR engine 130 of the electronic device 100 so as to authenticate the user of the electronic device 100.

1) The AR animator 131 and the camera 110 are activated.

2) The basic coordinates and destination coordinates for the 3D plane are acquired.

3) The movement of the electronic device 100 and the user is observed until the coordinates of the destination and the electronic device 100 do not match.

4) When the electronic device 100 does not perform necessary operations within a limited time, the execution of the AR animator 131 and the camera 110 is disabled and the authentication is set as failed.

5) When the electronic device 100 is at the destination coordinates,
   a. The live challenge engine 120 may select a type of questionnaire [such as a one-tap activity] or an activity [such as user movement tracking].
   b. The live challenge engine 120 may receive event details of the object such as the size, the type, the subtype, the color, or the base coordinates of the object, and the number of objects. In addition, the live challenge engine 120 may transmit the received event details to the AR engine 130.

c. The AR engine 130 may receive information about the user's action, compare the user action with the resulting data, and transmit the resulting data to the authentication engine 140 or may transmit information regarding a result of the comparison to the authentication engine 140.

The authentication engine 140 may determine whether the request is successful. Specifically, the authentication engine 140 may determine whether the request is successful, based on the comparison between the original result transmitted by the live challenge engine 120 and the user behavior according to data transmitted by the AR engine 130.

FIGS. 7A to 7D are diagrams for describing an example scenario for authenticating the user of the electronic device 100, according to an embodiment of the disclosure. In the embodiment of the disclosure, it is assumed that the user wants to access the electronic device 100.

Figure 7A:
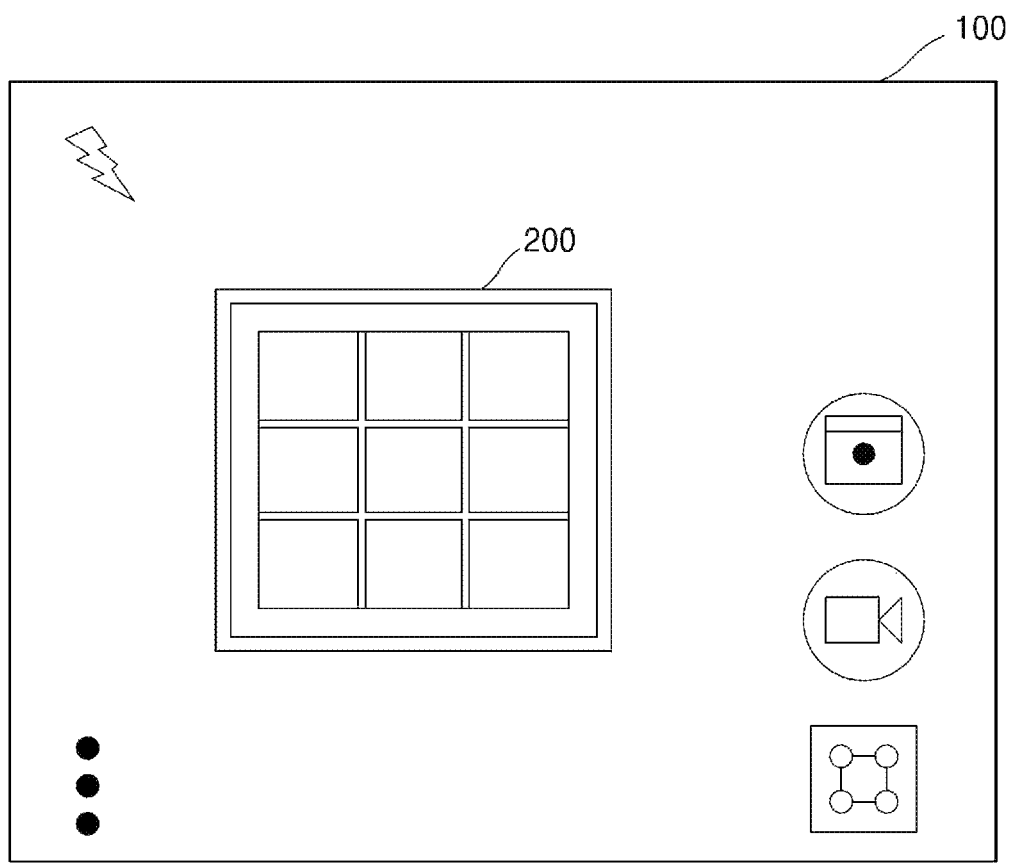
FIG. 7A is a diagram for describing a process by which an electronic device captures and displays an image of an object around a user, according to an embodiment of the disclosure.

The electronic device 100 may receive an access request from a user. When the access request is received, the electronic device 100 may automatically drive the camera 110 to capture an image of an object around the user displayed in the FoV of the camera 110. FIG. 7A is a diagram for describing a process by which the electronic device 100 captures and displays the object around the user, according to an embodiment of the disclosure. When the user is at home, the window 200 may be displayed on the electronic device, as illustrated in FIG. 7A.

Figure 7B:
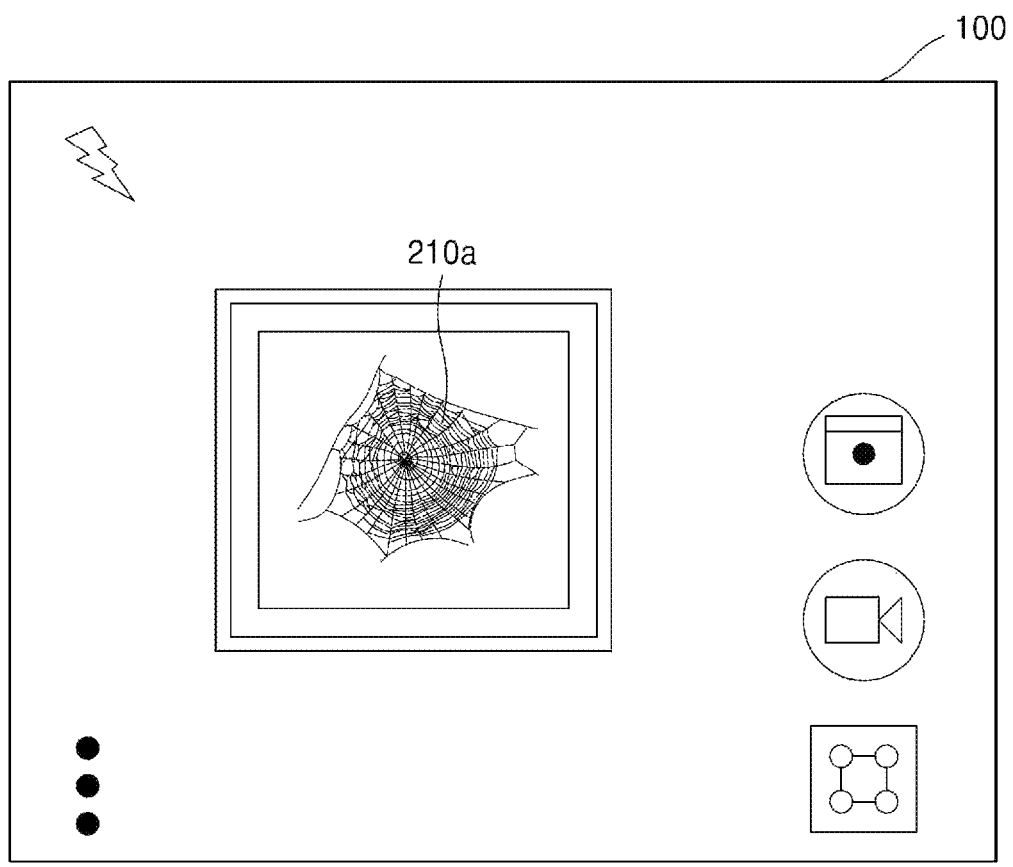
FIG. 7B is a diagram for describing a process by which an electronic device determines a story based on an object around a user, according to an embodiment of the disclosure.

In addition, the electronic device 100 may determine the user story based on the detected object and the situation of the user. FIG. 7B is a diagram for describing a process by which the electronic device 100 determines the story based on the object around the user, according to an embodiment of the disclosure. The story may include a spider web 210a selected from the database, based on the detected object (such as the window 200), as illustrated in FIG. 7B. In addition, according to another embodiment of the disclosure, the electronic device 100 may determine the story based on the detected object and the situation of the user.

Figure 7C:
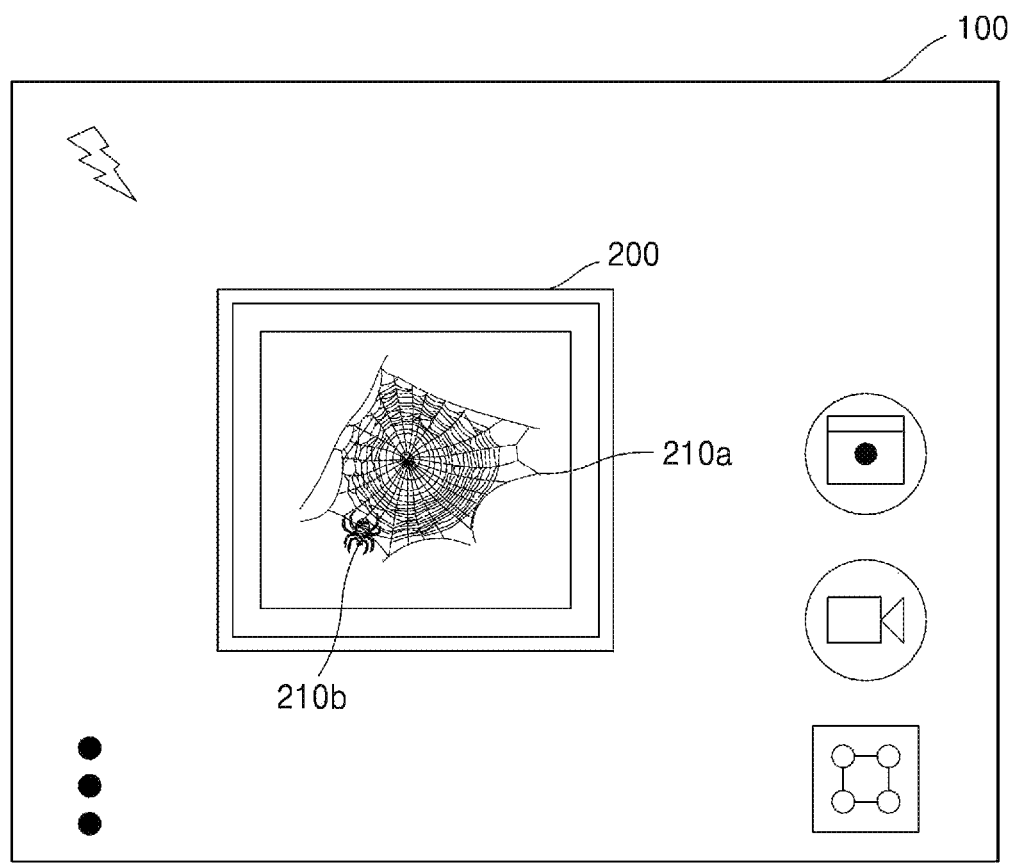
FIG. 7C is a diagram for describing a process by which an electronic device determines an actor for a story, according to an embodiment of the disclosure.

In addition, the electronic device 100 may determine the actor for the selected user story based on the context of the user. FIG. 7C is a diagram for describing a process by which the electronic device 100 determines the actor for the story, according to an embodiment of the disclosure. The actor is a spider 210b selected from the database based on the detected object (such as the window 200) and the story, as illustrated in FIG. 7C.

Figure 7D:
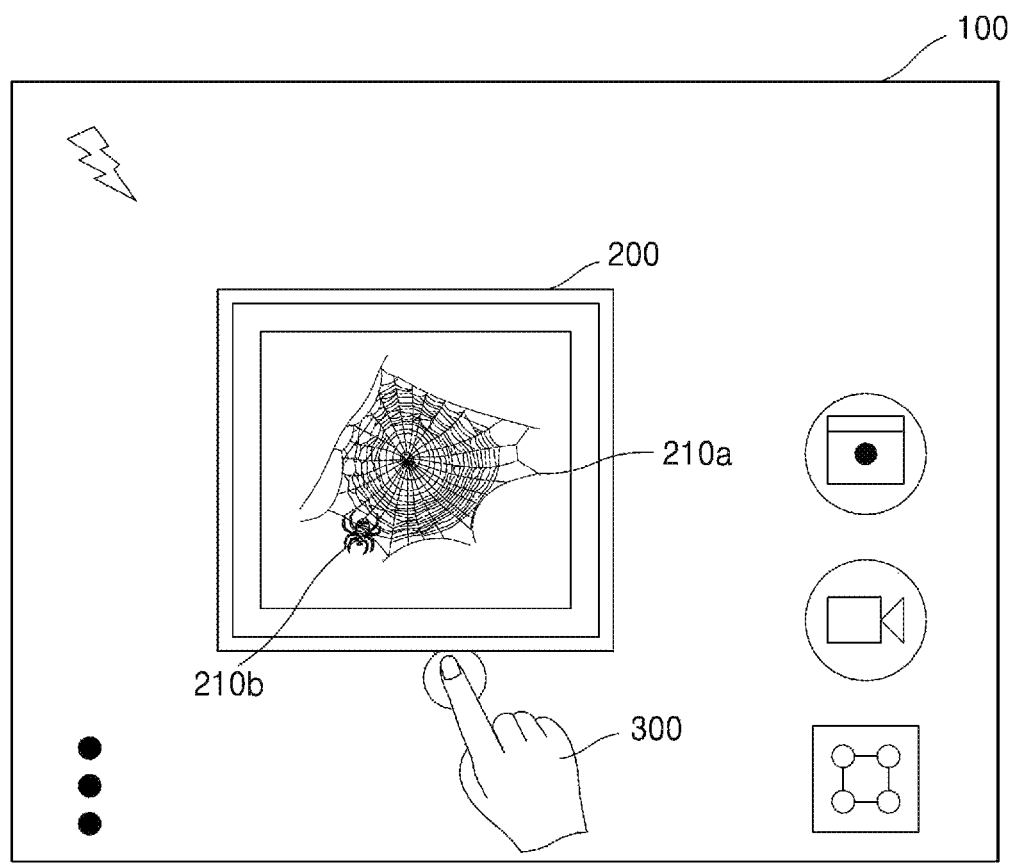
FIG. 7D is a diagram for describing a process by which an electronic device generates a live challenge based on a story, an actor, and a task, according to an embodiment of the disclosure.

In addition, the electronic device 100 may generate the live challenge for the user based on the selected story and the actor. Specifically, the electronic device 100 may determine the task based on the story and the actor. FIG. 7D is a diagram for describing a process by which the electronic device 100 generates the live challenge based on the story, the actor, and the task, according to an embodiment of the disclosure. Referring to FIG. 7D, the electronic device 100 may display the AR image in which the spider 210b and the spider web 210a are augmented on the window 200, and may present the task of killing the spider 210b. The user may be requested to kill the spider 210b as the live challenge, as illustrated in FIG. 7D. When the user moves his or her hand 300 toward the spider 210b and performs tapping to kill the spider 210b, the live challenge may be completed. The electronic device 100 may continuously monitor the user's movement so as to determine whether the live challenge has been completed. Therefore, the electronic device 100 may mutually identify and authenticate the user.

Figure 8A:
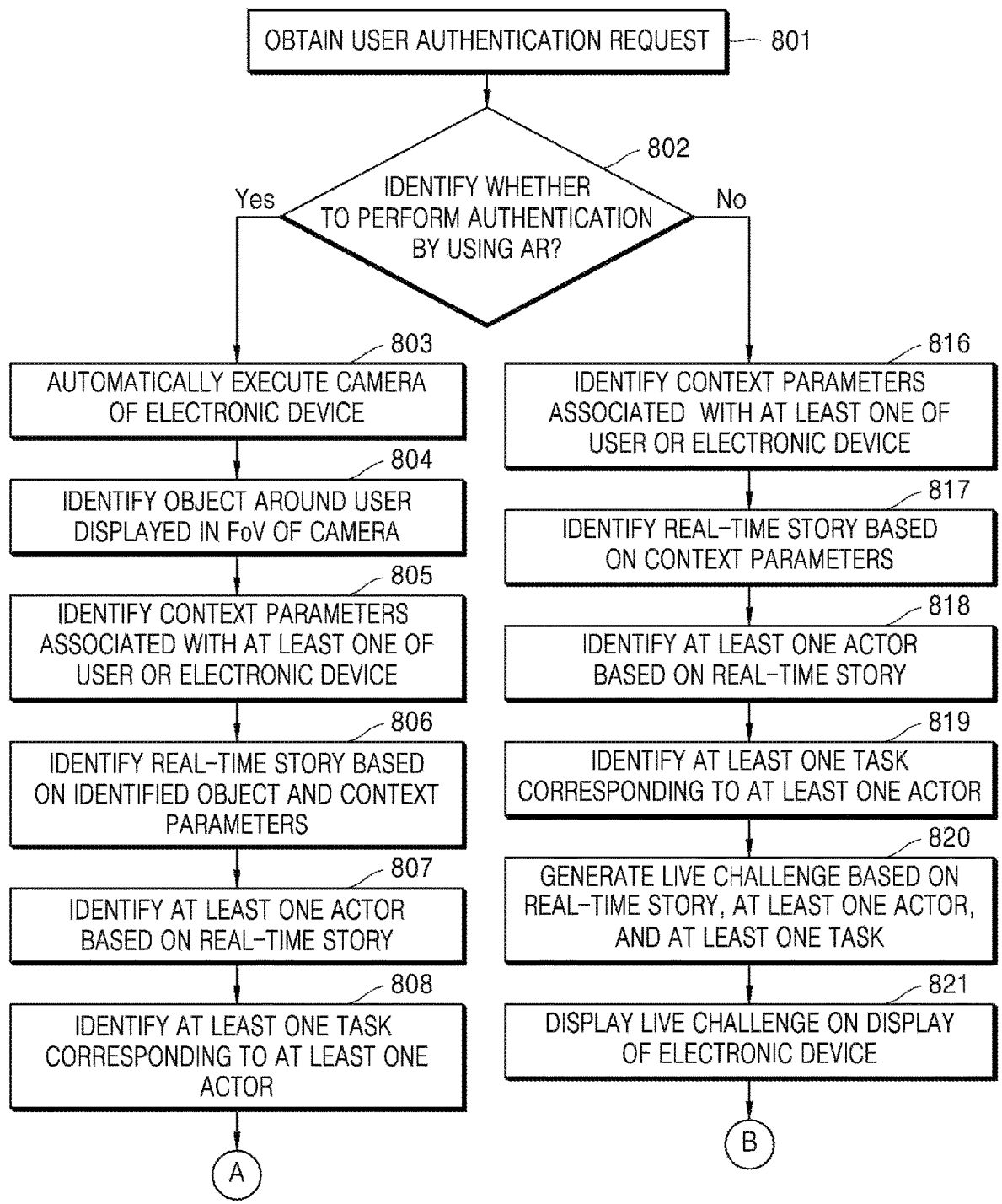
FIG. 8A illustrates a first part of a flowchart for describing a method of authenticating a user of an electronic device, according to an embodiment of the disclosure.
Figure 8B:
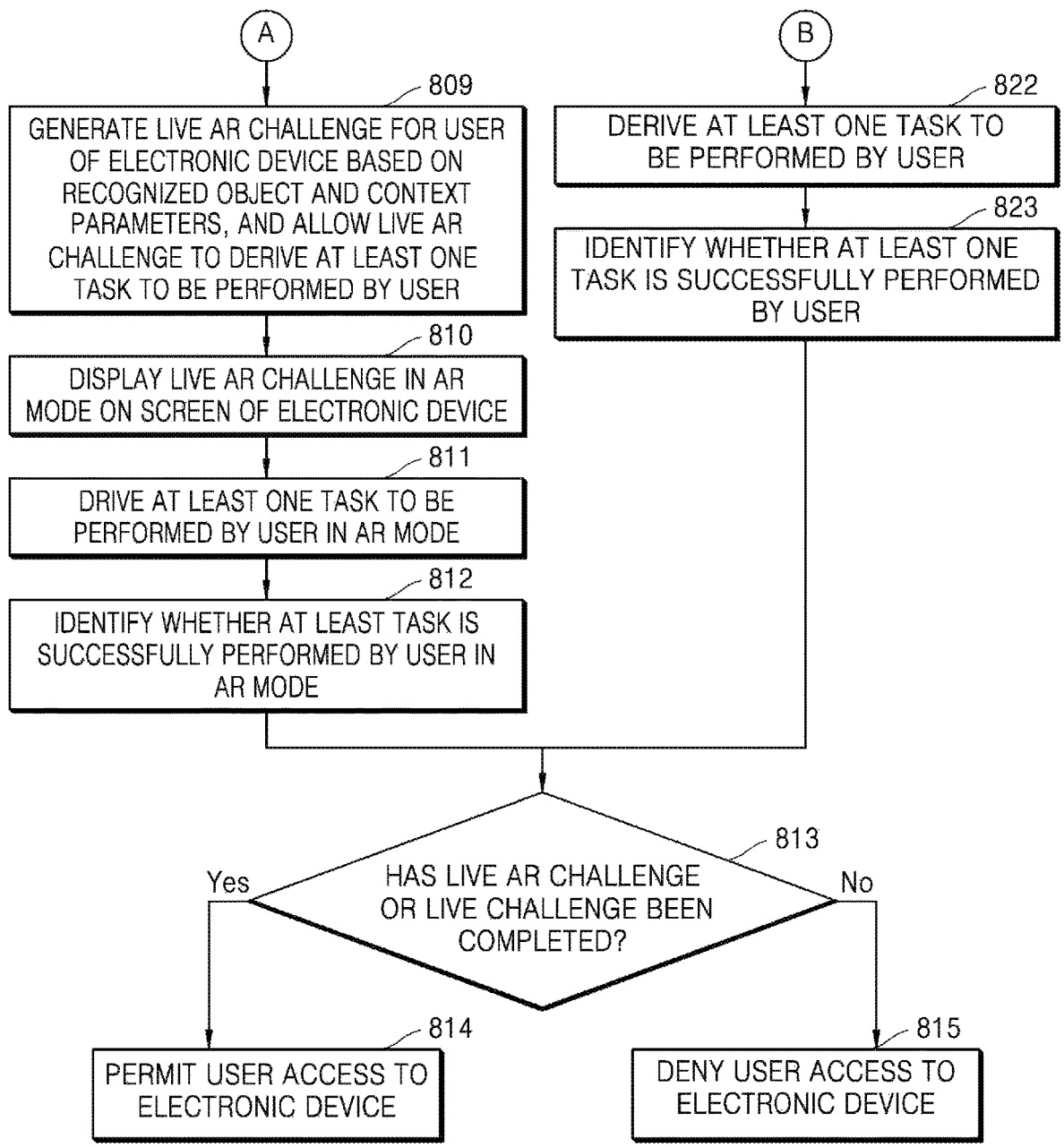
FIG. 8B illustrates a second part of a flowchart for describing a method of authenticating a user of an electronic device, according to an embodiment of the disclosure.

FIG. 8A illustrates a first part of the flowchart for describing the method of authenticating the user of the electronic device 100, according to an embodiment of the disclosure. FIG. 8B illustrates a second part of the flowchart for describing the method of authenticating the user of the electronic device, according to an embodiment of the disclosure.

Hereinafter, the user authentication method according to the embodiment of the disclosure will be described in detail with reference to FIGS. 8A and 8B.

In operation 801, the electronic device 100 may obtain the user authentication request. For example, the live challenge engine 120 included in the electronic device 100 may obtain the request to authenticate the user.

In operation 802, the electronic device 100 may identify whether to perform authentication by using the AR. For example, the live challenge engine 120 may identify whether the authentication is performed by using the AR.

The electronic device 100 according to the embodiment of the disclosure may display a message asking whether to perform the authentication by using the AR and identify whether to perform the authentication by using the AR based on a user response to the authentication. According to another embodiment of the disclosure, when the electronic device 100 is operating in the AR mode, the electronic device 100 may identify that the authentication is performed by using the AR without further query.

In operation 803, the electronic device 100 may automatically execute the camera 110. The electronic device 100 may execute the camera 100 when the electronic device 100 identifies that the authentication is performed by using the AR. In addition, the live challenge engine 120 included in the electronic device 100 may perform the corresponding operation.

In operation 804, the electronic device 100 may identify the object around the user displayed in the FoV of the camera. For example, the object recognition engine 121 included in the electronic device 100 may identify the object around the user.

In operation 805, the electronic device 100 may identify a plurality of context parameters associated with at least one of the user or the electronic device 100. For example, the context determination engine 122 included in the electronic device 100 may identify the context parameters associated with at least one of the user or the electronic device 100.

In operation 806, the electronic device 100 may identify the real-time story based on the recognized object and the context parameters. For example, the real-time story engine 125 included in the electronic device 100 may identify the real-time story based on the recognized object and the context parameters.

Information about the story corresponding to the object and the context parameters may be previously stored in the database of the electronic device 100. When the electronic device 100 recognizes the object and identifies the context parameters indicating the current situation, the electronic device 100 may identify the real-time story through the comparison with the information previously stored in the database.

In operation 807, the electronic device 100 may identify at least one actor based on the real-time story. For example, the actor determination engine 126 included in the electronic device 100 may identify at least one actor based on the real-time story.

The database of the electronic device 100 may previously store information about at least one actor that may be set for each story. When the story is determined, the electronic device 100 according to the embodiment of the disclosure may determine the actor based on at least one of the determined story, the context parameters, or the recognized object.

In operation 808, the electronic device 100 may identify at least one task to be applied to at least one actor. For example, the task determination engine 127 included in the electronic device 100 may determine at least one task to be applied to at least one actor.

The database of the electronic device 100 may previously store information about at least one task that may be set for each story. The electronic device 100 according to the embodiment of the disclosure may determine the task based on at least one of the story, the actor, the context parameters, or the recognized object.

In operation 809, the electronic device 100 may generate the live AR challenge for the user of the electronic device 100 based on the recognized object and the context parameters. The electronic device 100 may generate the live AR challenge based on the story, the actor, and the task. The live AR challenge may allow the user to derive the task to be performed.

For example, the live challenge engine 120 included in the electronic device 100 may generate the live AR challenge for the user based on the recognized object and the context parameters.

In operation 810, the electronic device 100 may display the live AR challenge on the display in the AR mode.

In operation 811, the electronic device 100 may derive at least one task to be performed by the user in the AR mode. For example, the task determination engine 127 may determine at least one task to be performed by the user in the AR mode.

In operation 812, the electronic device 100 may identify whether at least one task is successfully performed by the user in the AR mode. For example, the response determination engine 128 included in the electronic device 100 may determine whether at least one task is successfully performed by the user in the AR mode.

In operation 813, the electronic device 100 may identify whether the live AR challenge has been completed. For example, the live challenge engine 120 may determine whether the live AR challenge has been completed.

In operation 814, the electronic device 100 may permit the user access to the electronic device. When the user has completed the live AR challenge, the electronic device 100 may permit the user access to the electronic device.

In operation 815, the electronic device 100 may deny the user access to the electronic device. When the user fails to complete the live AR challenge, the electronic device 100 may deny the user access to the electronic device.

For example, the authentication engine 140 may deny the user access to the electronic device 100.

In operation 816, the electronic device 100 may identify the context parameters associated with at least one of the user or the electronic device 100. When the electronic device 100 determines not to perform the authentication by using the AR, the electronic device 100 may determine the context parameters associated with at least one of the user or the electronic device 100. For example, the context determination engine 122 may determine the context parameters associated with at least one of the user or the electronic device 100.

In operation 817, the electronic device 100 may identify the real-time story based on the context parameters. For example, the real-time story engine 125 may determine the real-time story based on the context parameters.

In operation 818, the electronic device 100 may identify at least one actor based on the real-time story. For example, the actor determination engine 126 may determine at least one actor based on the real-time story.

In operation 819, the electronic device 100 may identify at least one task to be applied to at least one actor. For example, the task determination engine 127 may determine at least one task to be applied to at least one actor.

In operation 820, the electronic device 100 may generate the live challenge based on the real-time story, at least one actor, and at least one task. For example, the live challenge engine 120 may generate the live challenge for the user of the electronic device 100 based on the real-time story, at least one actor, and at least one task.

In operation 821, the electronic device 100 may display the live challenge on the display 180.

In operation 822, the electronic device 100 may derive at least one task to be performed by the user. For example, the task determination engine 127 may derive at least one task to be performed by the user.

In operation 823, the electronic device 100 may identify whether at least one task is successfully performed by the user. For example, the response determination engine 128 may determine whether at least one task has been successfully performed by the user.

The various operations, blocks, steps, and the like in the flowchart 800 described above may be performed in different orders or at the same time. Furthermore, in some embodiments of the disclosure, some of the operations, blocks, steps, and the like may be omitted, added, or modified without departing from the scope of the disclosure.

Figure 9:
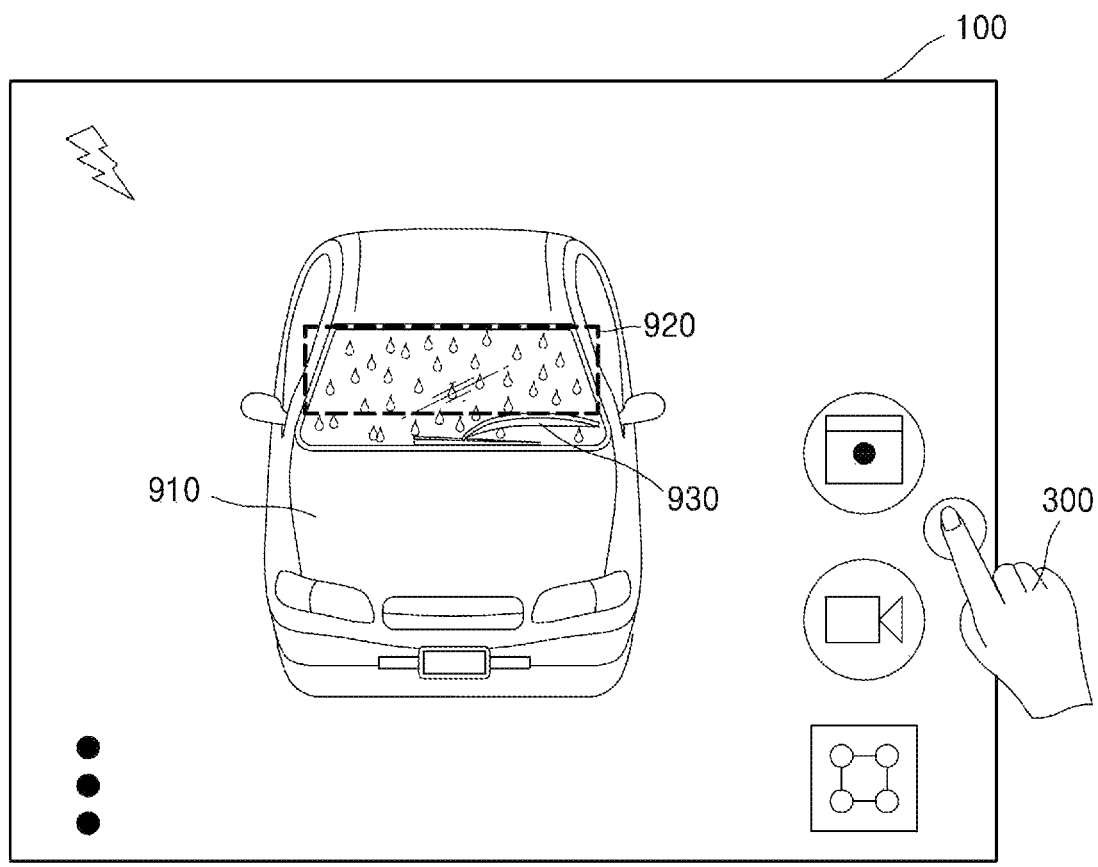
FIG. 9 is a diagram for describing a method by which an electronic device authenticates a user by using a live challenge generated based on weather information, according to an embodiment of the disclosure.

FIG. 9 is a diagram for describing a method by which the electronic device 100 authenticates the user by using the live challenge generated based on weather information, according to an embodiment of the disclosure.

The electronic device 100 may obtain the user authentication request from the user. In the embodiment of the disclosure, it is assumed that the user authentication of the electronic device 100 is performed in the AR mode.

Referring to FIG. 9, when the user authentication request is obtained, the electronic device 100 may automatically execute the camera. Therefore, the image of the object around the user may be captured in the FoV of the camera. For example, an image of a vehicle 910 may be captured in the FoV of the camera 110.

Meanwhile, the electronic device 100 may determine that the current weather is cloudy, based on the context parameters. The electronic device 100 may determine to perform the raindrop removal on the actor and the task with the wipers 930 of the vehicle based on the captured object image and the context parameters. Therefore, the electronic device 100 may superimpose the AR image of the wiper 930 of the vehicle and the raindrop 920 on the real world image of the vehicle 910 captured in the FoV of the camera. In addition, the electronic device 100 may provide the live AR challenge by outputting a question or a statement that prompts the raindrop 920 to be removed by touching the wiper 930 together with the image in which the real world image and the AR image are superimposed.

The user access to the electronic device 100 may be permitted when the user completes the live challenge of touching the wiper 930 with the hand 300 to remove the raindrop 920.

Figure 10:
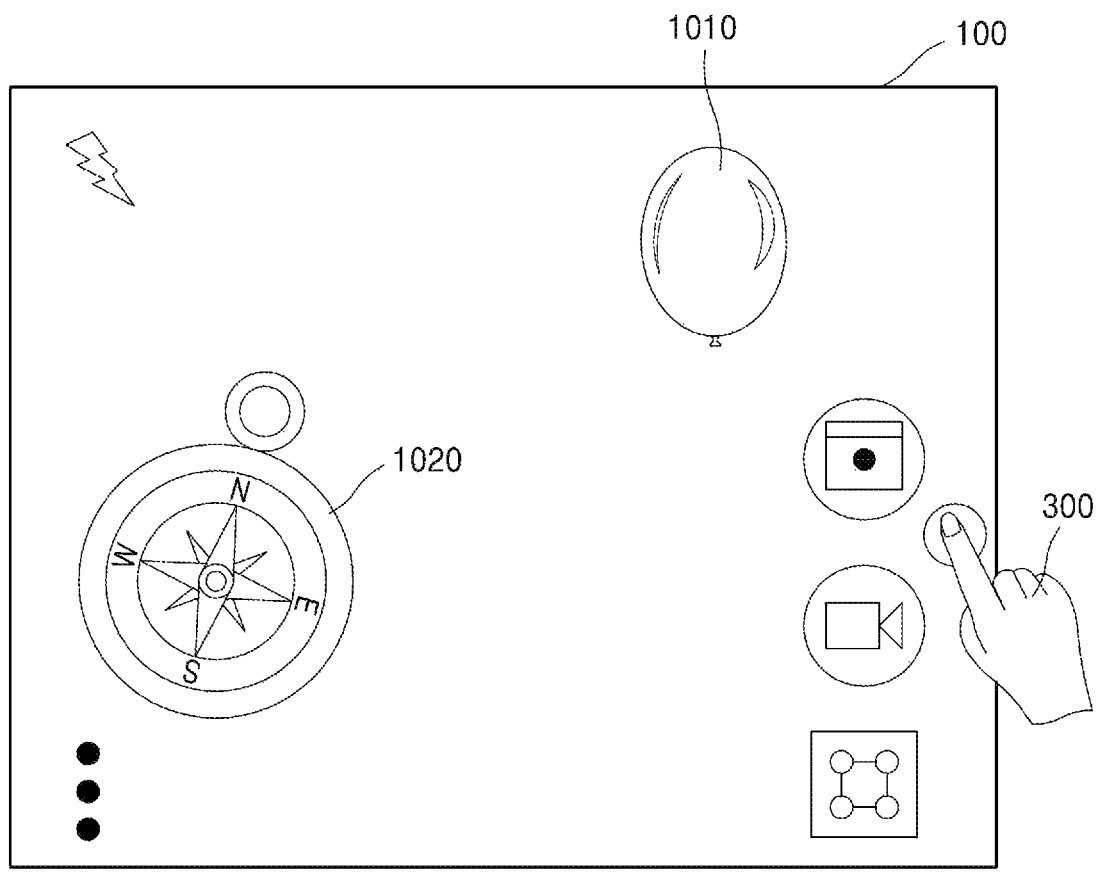
FIG. 10 is a diagram for describing a method of authenticating a user by using a live challenge generated based on a recognized object, according to an embodiment of the disclosure.

FIG. 10 is a diagram for describing the method of authenticating the user by using the live challenge generated based on the recognized object, according to an embodiment of the disclosure.

The electronic device 100 may obtain the user authentication request from the user. In the embodiment of the disclosure, it is assumed that the user authentication of the electronic device 100 is performed in the AR mode.

Referring to FIG. 10, when the user authentication request is obtained, the electronic device 100 may automatically execute the camera. Therefore, the image of the object around the user may be captured in the FoV of the camera. For example, an image of a balloon 1010 may be captured in the FoV of the camera.

The electronic device 100 may generate the live challenge based on the captured object image. For example, the electronic device 100 may select a compass 1020 as the actor that constitutes the live challenge. In addition, the electronic device 100 may determine that the task constituting the live challenge indicates the direction of the balloon 1010 by using the compass 1020. In addition, the user may be requested to complete the live AR challenge that rotates the compass 1020 so that the needle points to the balloon 1010. The user may access the electronic device 100 by rotating the needle of the compass 1020 in the direction of the balloon 1010 with his or her hand 300.

Figure 11:
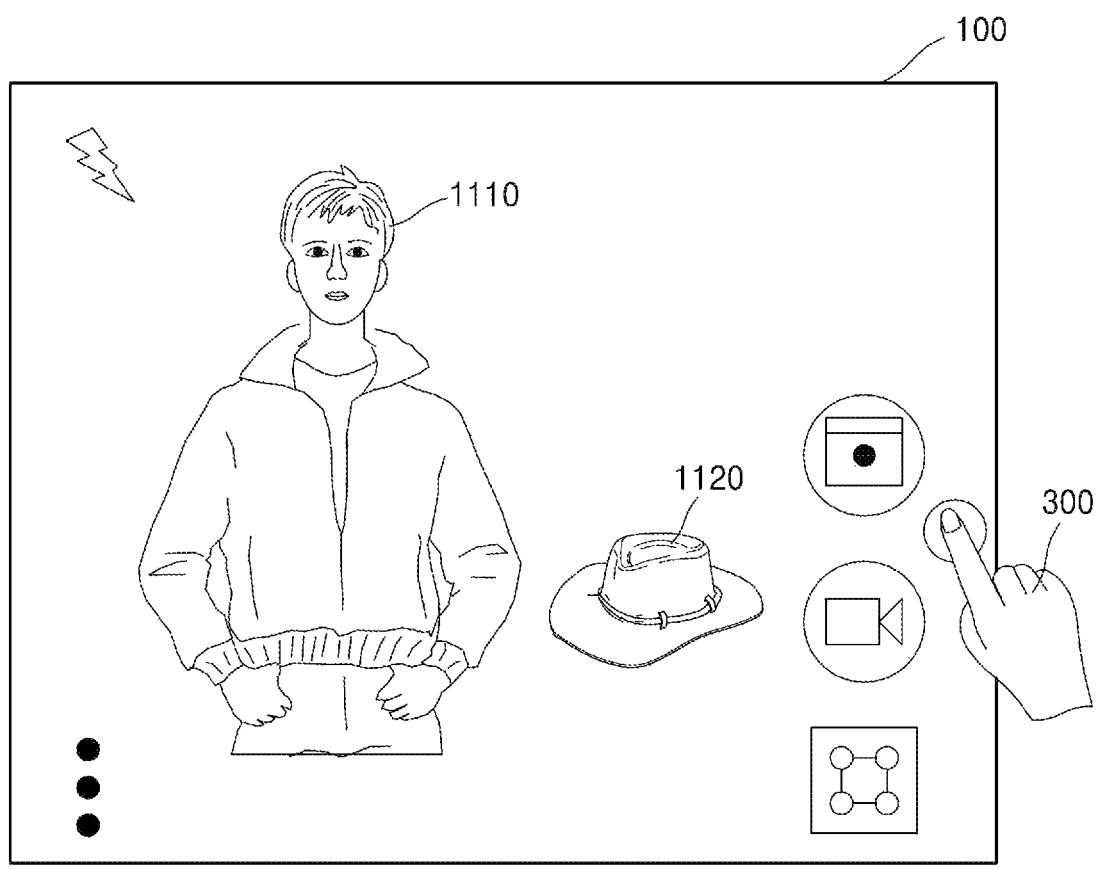
FIG. 11 is a diagram for describing a method of authenticating a user by using a live challenge generated based on a recognized object, according to an embodiment of the disclosure.

FIG. 11 is a diagram for describing the method of authenticating the user by using the live challenge generated based on the recognized object, according to an embodiment of the disclosure.

The electronic device 100 may receive the user authentication request from the user. In the embodiment of the disclosure, it is assumed that the user authentication of the electronic device 100 is performed in the AR mode.

Referring to FIG. 11, when the user authentication request is received, the electronic device 100 may automatically execute the camera. Therefore, the image of the object around the user may be captured in the FoV of the camera. For example, an image of a cap 1120 may be captured in the FoV of the camera.

The electronic device 100 may generate the live challenge based on the captured object image. For example, the electronic device 100 may select a cowboy 1110 as the actor constituting the live challenge. In addition, the electronic device 100 may determine to cap the cowboy 1110 as the task that constitutes the live challenge. Therefore, the electronic device 100 may generate the live challenge by superimposing the AR image of the cowboy 1110 on the real world image of the cap 1120 captured in the FoV of the camera.

In addition, the electronic device 100 may provides the live AR challenge by outputting a question or a statement that prompts the user to move the cap 1120 to the head of the cowboy 1110 together with the image in which the real world image and the AR image are superimposed. In addition, the user may be requested to drag the cap 1120 into the hand 300 and place the cap 1120 on the face of the cowboy 1110.

Figure 12:
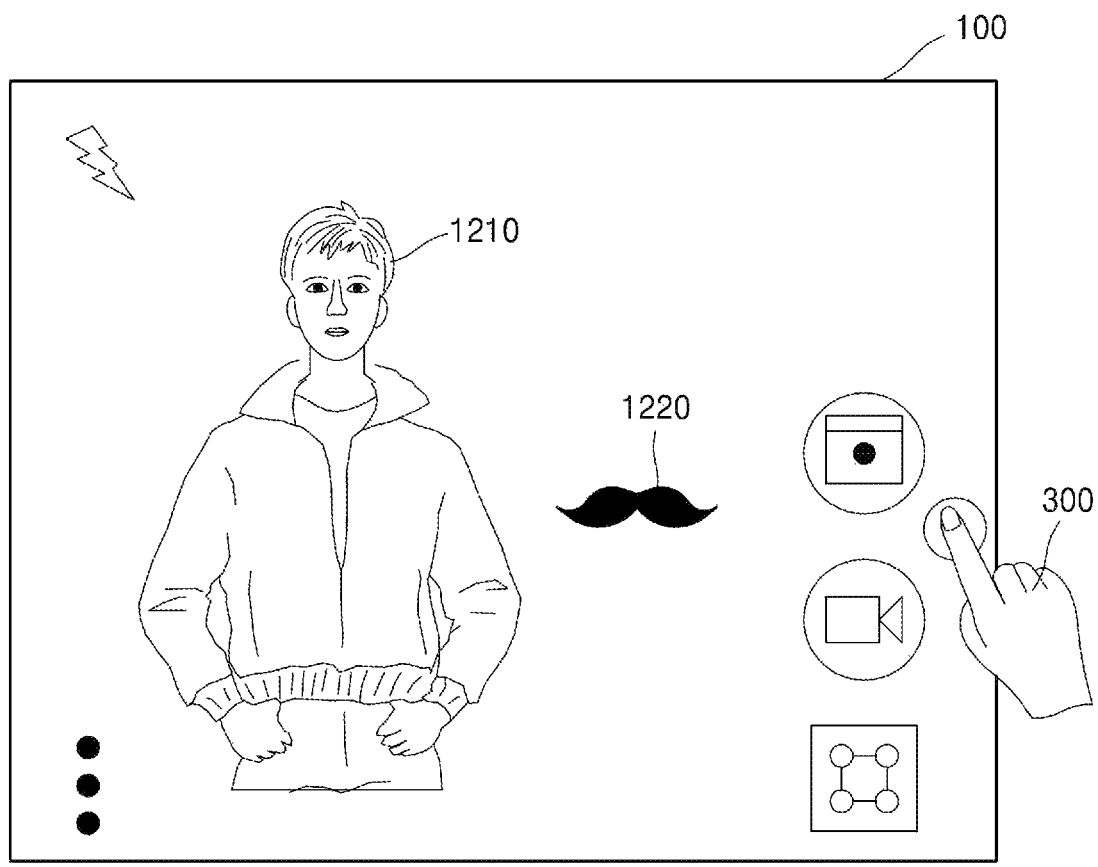
FIG. 12 is a diagram for describing a method of authenticating a user by using a live challenge generated based on a recognized object, according to an embodiment of the disclosure.

FIG. 12 is a diagram for describing the method of authenticating the user by using the live challenge generated based on the recognized object, according to an embodiment of the disclosure.

The electronic device 100 may receive the user authentication request from the user. In the embodiment of the disclosure, it is assumed that the user authentication of the electronic device 100 is performed in the AR mode.

Referring to FIG. 12, when the user authentication request is received, the electronic device 100 may automatically execute the camera. Therefore, the image of the object around the user may be captured in the FoV of the camera. For example, an image of a cowboy 1210 may be captured in the FoV of the camera.

The electronic device 100 may generate the live challenge based on the captured object image. For example, the electronic device 100 may determine to select the cowboy as the actor of the live challenge and attach a mustache 1220 to the cowboy 1210 as the task constituting the live challenge. Therefore, the electronic device 100 may generate the live challenge by superimposing the AR image of the mustache 1220 on the real world image of the cowboy 1220 captured in the FoV of the camera. In addition, the user may be requested to drag the mustache 1220 into the hand 300 and place the mustache 1220 on the face of the cowboy 1210.

Figure 13:
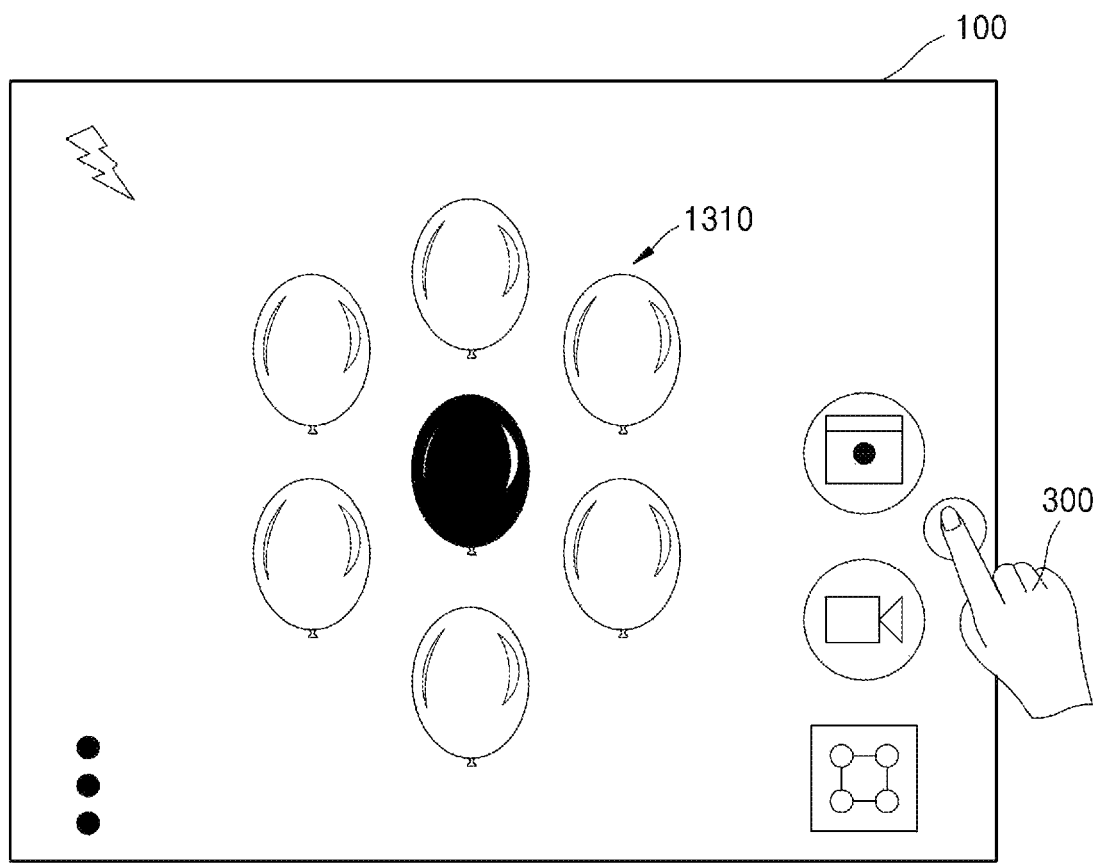
FIG. 13 is a diagram for describing a method of authenticating a user by using a live challenge generated based on a recognized object, according to an embodiment of the disclosure.

FIG. 13 is a diagram for describing the method of authenticating the user by using the live challenge generated based on the recognized object, according to an embodiment of the disclosure.

The electronic device 100 may receive the user authentication request from the user.

Referring to FIG. 13, when the user authentication request is received, the electronic device 100 may automatically execute the camera. Therefore, the image of the object around the user may be captured in the FoV of the camera.

The electronic device 100 may generate the live challenge based on the captured object image. For example, the electronic device 100 may determine to select a balloon 1310 of a different color captured by the camera as the actor constituting the live challenge and select an odd number of balloons of a specific color among the balloons of different colors as the task constituting the live challenge. Therefore, the electronic device 100 may output a question or a statement that prompts selection of an odd number of balloons of a specific color among the balloons 1310 of different colors captured in the FoV of the camera.

The access to the electronic device 100 may be permitted when the user completes the live challenge by selecting an odd number of balloons of a specific color with his or her hand 300.

Figure 14:
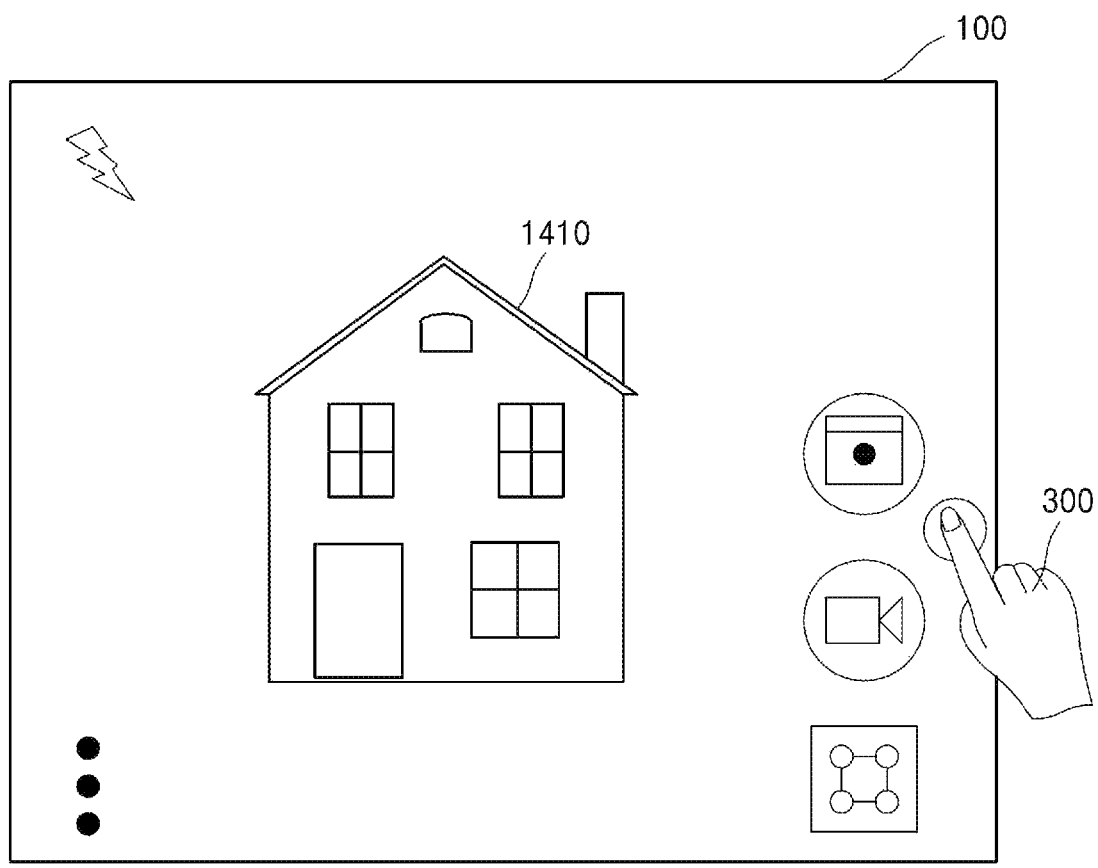
FIG. 14 is a diagram for describing a method of authenticating a user by using a live challenge generated based on a recognized object, according to an embodiment of the disclosure.

FIG. 14 is a diagram for describing the method of authenticating the user by using the live challenge generated based on the recognized object, according to an embodiment of the disclosure.

The electronic device 100 may receive the user authentication request from the user. Referring to FIG. 14, when the user authentication request is received, the electronic device 100 may automatically execute the camera. Therefore, the image of the object around the user may be captured in the FoV of the camera. For example, an image of a cabin 1410 may be captured in the FoV of the camera.

When the image of the cabin 1410 is captured, the electronic device 100 may determine to knock the door of the cabin 1410 as the live challenge. The electronic device 100 may output a question or a statement that prompts knocking the door of the cabin 1410 captured in the FoV of the camera.

The access to the electronic device 100 may be permitted when the user completes the live challenge of knocking the door of the cabin 1410 with his or her hand 300.

Figure 15:
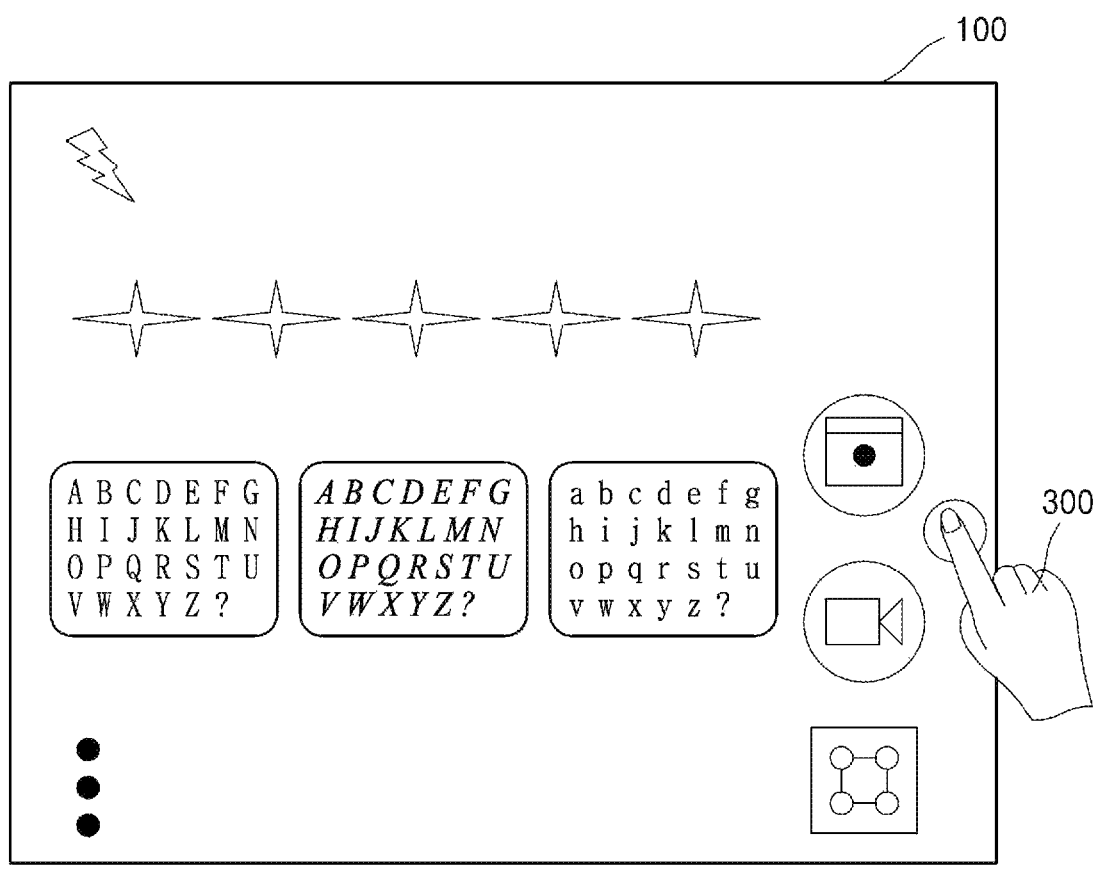
FIG. 15 is a diagram for describing a method of authenticating a user by using a live challenge generated based on context parameters, according to an embodiment of the disclosure.

FIG. 15 is a diagram for describing the method of authenticating the user by using the live challenge generated based on the context parameters, according to an embodiment of the disclosure.

The electronic device 100 may receive the user authentication request from the user. When the user authentication request is received, the electronic device 100 may provide a text input plate to input two or three letters of the password associated with the user. The password associated with the user is determined based on the context parameters, and may be a word indicating the situation of the user or the electronic device.

Meanwhile, for each letter, the letter input plate may be displayed on the display so that the first letter is input in bold, the second letter is input in italics, and the third letter is input in lower case. However, this is only an example, and a letter input plate in which a combination of letters is mixed to generate a more complex live challenge may be provided. In addition, according to another example, the size, color, or the like of letters may be differently set.

The user may perform the live challenge by touching a specific letter in each letter input plate with his or her hand 300. The user may access the electronic device 100 when the live challenge is successfully performed.

Figure 16:
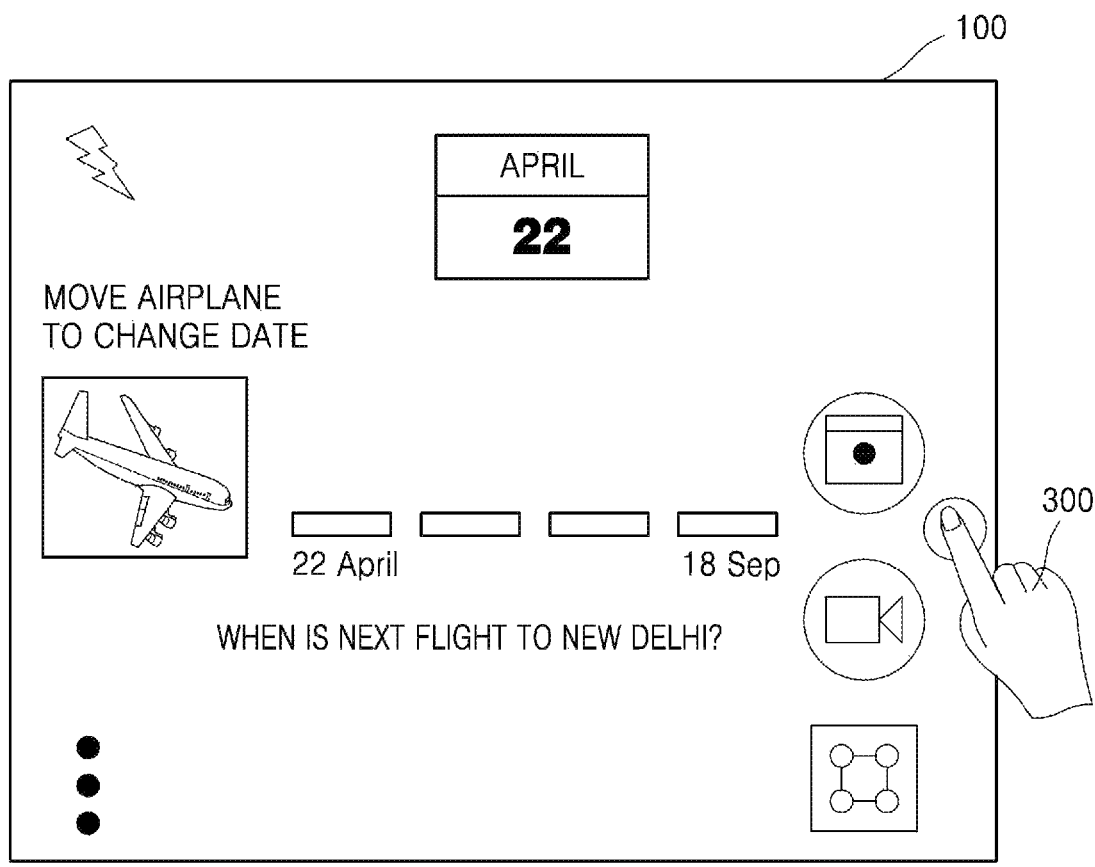
FIG. 16 is a diagram for describing a method of authenticating a user by using a live challenge generated based on context parameters, according to an embodiment of the disclosure.

FIG. 16 is a diagram for describing the method of authenticating the user by using the live challenge generated based on the context parameters, according to an embodiment of the disclosure.

The electronic device 100 may receive the user authentication request from the user. When the user authentication request is received, the electronic device 100 may determine the actor and the task constituting the live challenge based on the context parameters. Referring to FIG. 16, the electronic device 100 may store context information indicating that the user has recently booked an airplane ticket for traveling to New Delhi through the electronic device 100. Based on this, the electronic device 100 may generate the live challenge of moving the airplane so that the airplane is located on a travel date in a calendar.

Therefore, the electronic device 100 may display a question or a statement that prompts the airplane image, the calendar image on the display, and the airplane to be located on the travel date in the calendar. The user may access the electronic device 100 by dragging the airplane with his or her hand 300 and placing the airplane on the date corresponding to the travel date.

Figure 17:
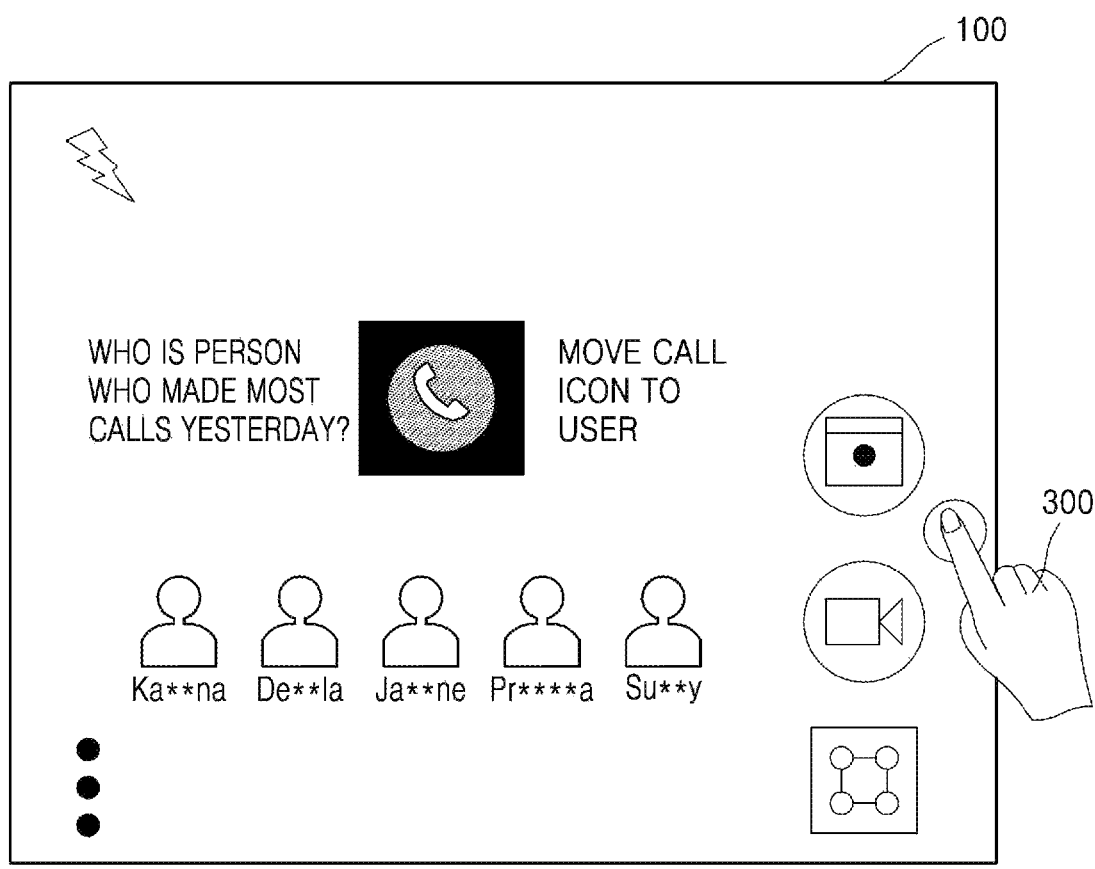
FIG. 17 is a diagram for describing a method of authenticating a user by using a live challenge generated based on context parameters, according to an embodiment of the disclosure.

FIG. 17 is a diagram for describing the method of authenticating the user by using the live challenge generated based on the context parameters, according to an embodiment of the disclosure.

The electronic device 100 may receive the user authentication request from the user. When the user authentication request is received, the electronic device 100 may determine the task and the actor constituting the live challenge based on the context parameters. Referring to FIG. 17, a user's call record may be stored in the electronic device 100. Based on this, the electronic device 100 may generate the live challenge of selecting who is the person who made the most calls yesterday.

Therefore, the electronic device 100 may display, on the display, a question or a statement that prompts the user to select a phone icon, information about the person the user called yesterday, and the person who has made the most calls yesterday. The user may access the electronic device 100 by dragging the phone icon with his or her hand 300 and placing the phone icon on the image of the person who has made the most calls yesterday.

Figure 18:
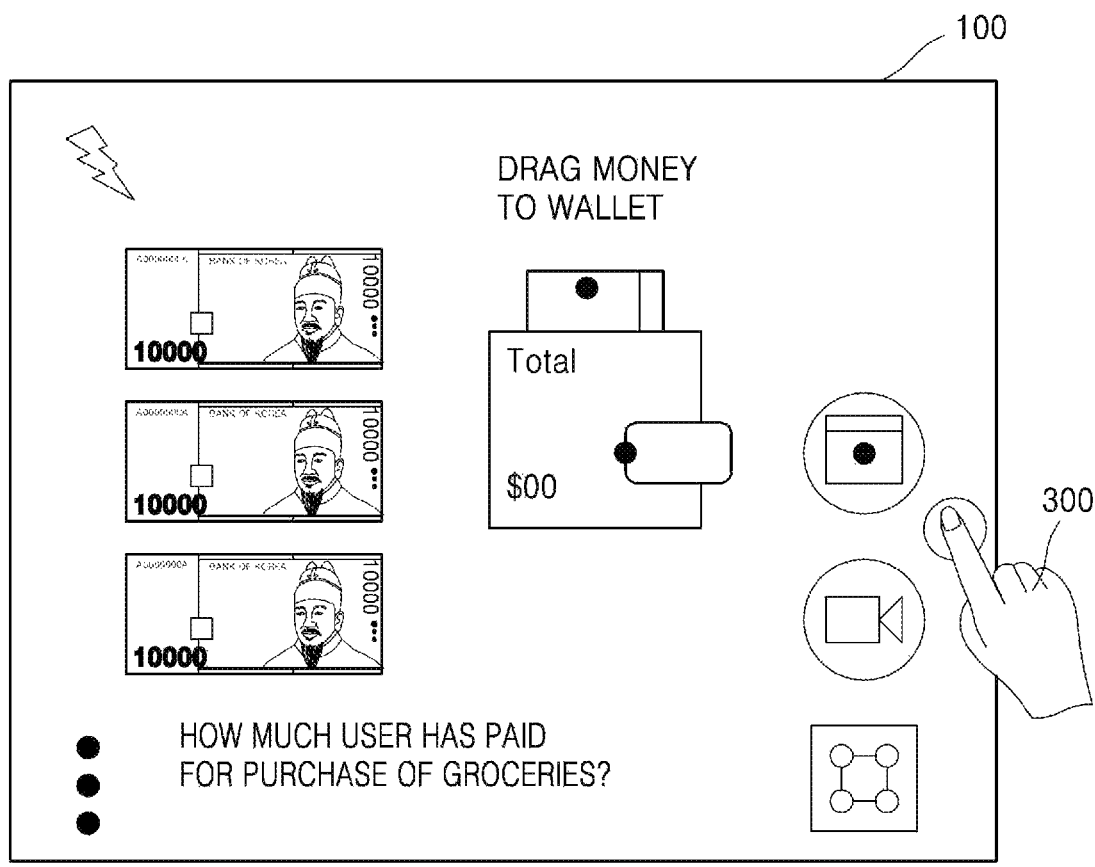
FIG. 18 is a diagram for describing a method of authenticating a user by using a live challenge generated based on context parameters, according to an embodiment of the disclosure.

FIG. 18 is a diagram for describing the method of authenticating the user by using the live challenge generated based on the context parameters, according to an embodiment of the disclosure.

The electronic device 100 may receive the user authentication request from the user. When the user authentication request is received, the electronic device 100 may determine the task and the actor constituting the live challenge based on the context parameters. Referring to FIG. 18, a user's expenditure history may be stored in the electronic device 100. Based on this, the electronic device 100 may generate the live challenge of selecting how much the user has paid the most in a grocery store.

Therefore, the electronic device 100 may display a money image and a wallet image on the display, and may display a question or a statement that prompts the user to select how much he paid for the grocery purchase. The user may repeatedly perform the operation of dragging the money image to the wallet with his or her hand 300 until the amount of money paid by the user is indicated. The user may access the electronic device 100 when the user completes the live challenge.

Figure 19:
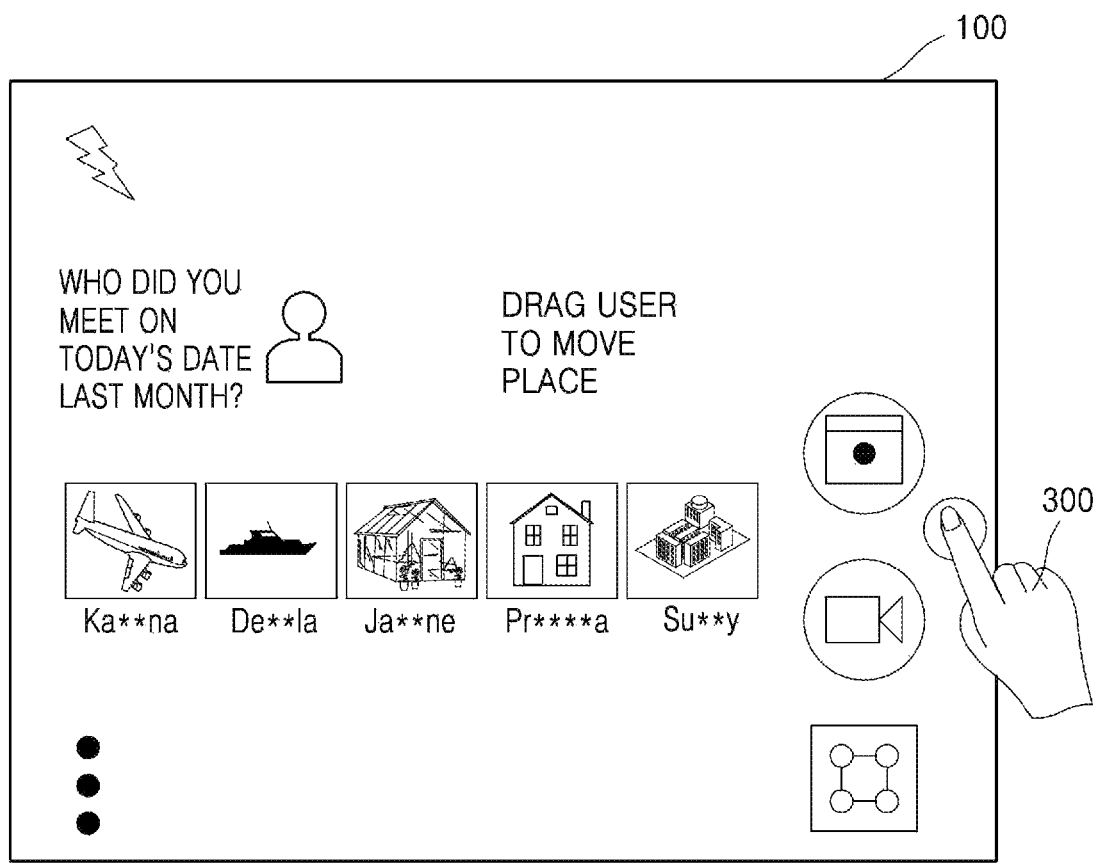
FIG. 19 is a diagram for describing a method of authenticating a user by using a live challenge generated based on context parameters, according to an embodiment of the disclosure.

FIG. 19 is a diagram for describing the method of authenticating the user by using the live challenge generated based on the context parameters, according to an embodiment of the disclosure.

The electronic device 100 may receive the user authentication request from the user. When the user authentication request is received, the electronic device 100 may determine the task and the actor constituting the live challenge based on the context parameters. Referring to FIG. 19, the electronic device 100 may store a user's call record, messenger record, schedule information, photograph, and the like. Based on this, the electronic device 100 may generate the live challenge of allowing the user to select who the user met on today's date last month and where the user met.

Therefore, the electronic device 100 may display, on the display, a plurality of place images including an image of a place where the user actually went to today's date last month and an image of another place. In addition, when the user inputs information about the person who met on today's date last month, the electronic device 100 may display a question or a statement that prompts the user to generate a corresponding image and move the image to a specific place. The user may complete the live challenge by dragging the image of the person who met on today's date last month with his or her hand 300 on the image of the specific place. The user may access the electronic device 100 when the user completes the live challenge.

Figure 20:
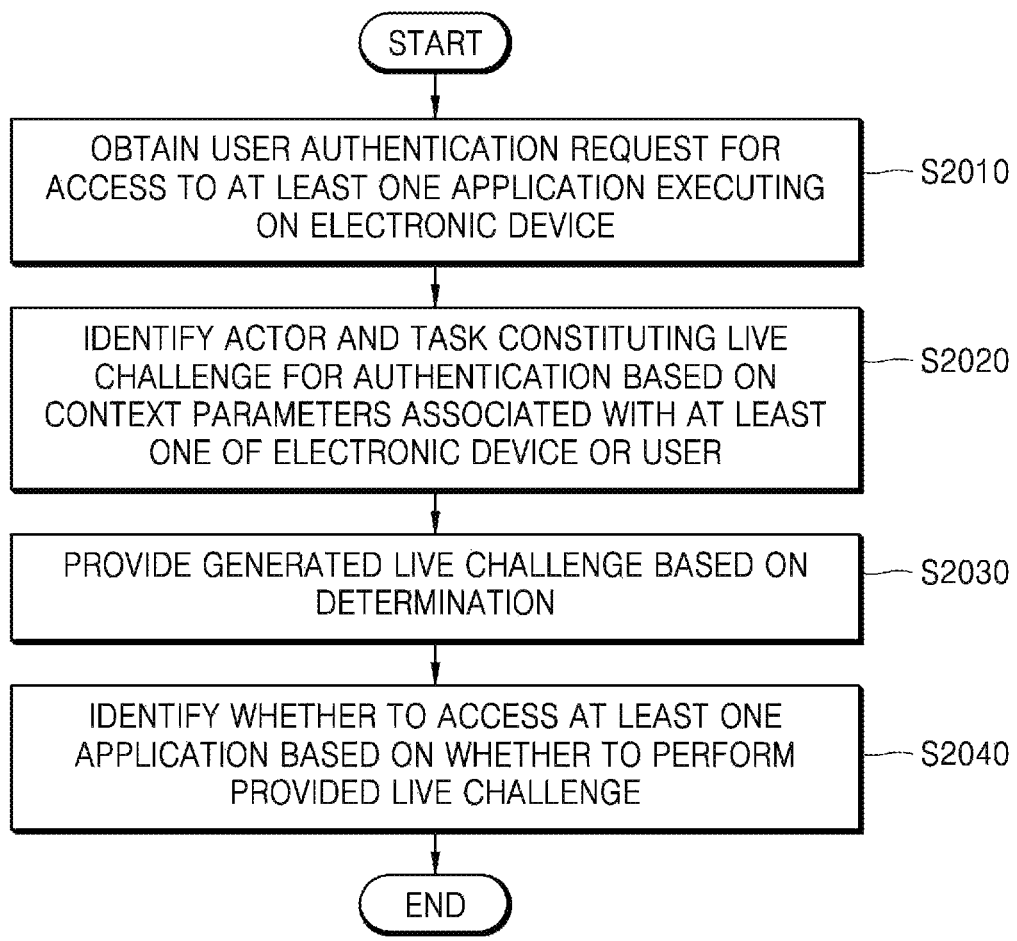
FIG. 20 is a diagram for describing a method by which an electronic device performs user authentication, according to an embodiment of the disclosure.

FIG. 20 is a diagram for describing a method by which an electronic device performs user authentication, according to an embodiment of the disclosure.

In operation S2010, the electronic device may obtain a user authentication request for access to at least one application executing on the electronic device. For example, in a case in which the electronic device is in a locked state, when the touch input is obtained from the user, the electronic device may determine that a user authentication request for access to a home screen of the electronic device has been obtained. However, this is only an example, and the method of receiving the user authentication request is not limited to the above-described example.

In operation S2020, the electronic device may identify an actor and a task constituting a live challenge for authentication based on context parameters associated with at least one of the electronic device or the user.

The electronic device according to the embodiment of the disclosure may determine the situation of the electronic device or the user based on the context parameters. The electronic device may determine the actor and the task constituting the live challenge based on the determined situation, for user authentication in an interactive manner. The actor may be a person, a thing, an animal, or the like as an object to perform a specific task.

Meanwhile, according to another embodiment of the disclosure, the electronic device may identify the sensed object on the FoV of the camera and determine the actor and the task constituting the live challenge based on the identified object. This may correspond to the method of generating the live challenge described with reference to FIGS. 9 to 14.

In operation S2030, the electronic device may provide the live challenge generated based on the determination.

The electronic device according to the embodiment of the disclosure may output, to the device, a question or a statement that prompts execution of an image and a task related to the actor and the task constituting the live challenge.

In operation S2040, the electronic device may identify whether to access at least one application based on whether to perform the provided live challenge.

When the user's action corresponding to the live challenge is not identified within a predetermined time, the electronic device according to the embodiment of the disclosure may deny the access to at least one application. When the user's action corresponding to the live challenge is identified within a predetermined time, the electronic device may permit the access to the at least one application.

Figure 21:
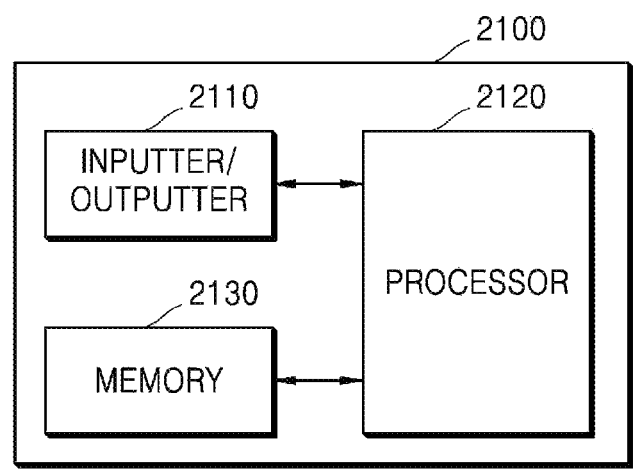
FIG. 21 is a block diagram of an electronic device that performs user authentication, according to an embodiment of the disclosure.

FIG. 21 is a block diagram of an electronic device 2100 that performs user authentication, according to an embodiment of the disclosure.

Referring to FIG. 21, the electronic device 2100 according to the embodiment of the disclosure may include an inputter/outputter 2110, a processor 2120, and a memory 2130. However, all illustrated components are not essential components. The electronic device 2100 may be implemented with more components than the illustrated components, or may be implemented with fewer components than the illustrated components. For example, the electronic device 2100 may include a plurality of processors, and may include a camera and at least one sensor.

Hereinafter, the components will be described in sequence.

The inputter/outputter 2110 is configured to obtain a user input or output an audio signal or an image signal, and may further include a display and an audio outputter. However, this is only an example, and the components of the inputter/outputter 2110 are not limited to the above-described example.

The inputter/outputter 2110 according to the embodiment of the disclosure may obtain a user authentication request. When the user authentication request is obtained, the inputter/outputter 2110 may output the generated live challenge based on the context parameters. In addition, when the live challenge is provided, the inputter/outputter 2110 may obtain information that the user inputs to perform the live challenge.

The processor 2120 generally controls the overall operation of electronic device 2100. For example, the processor 2120 may perform the operations of the above-described user authentication method by executing programs stored in the memory 2130.

The processor 2120 may control the inputter/outputter 2110 to obtain the user authentication request for the access to at least one application executing on the electronic device. In addition, the processor 2120 may determine the actor and the task constituting the live challenge for authentication based on the context parameters associated with at least one of the electronic device or the user. The processor 2120 may provide the live challenge generated based on the determination via the inputter/outputter 2110. In addition, the processor 2120 may determine whether to access at least one application based on whether to perform the provided live challenge.

The processor 2120 according to the embodiment of the disclosure may identify the object displayed in the FoV of the camera (not illustrated). The processor 2120 may determine the actor and the task based on the identified object and the context parameters. In addition, the processor 2120 may display a question prompting the determined task via the inputter/outputter.

When the AR mode is set in the electronic device 2100, the processor 2120 according to the embodiment of the disclosure may output the AR image of the live challenge constituted by the actor and the task on the identified object in a superimposing manner.

The processor 2120 according to the embodiment of the disclosure may determine movement information about the electronic device or the user after object identification based on the electronic device or user's movement identified via the sensor (not illustrated). The processor 2120 may adjust the position at which the AR image is output, based on the determined movement information.

The processor 2120 according to the embodiment of the disclosure may identify the location of the electronic device via the sensor (not illustrated). The processor 2120 may determine the object around the host device based on the location of the electronic device identified via the sensor (not illustrated). The processor 2120 may determine the actor and the task based on the determined object and the context parameters.

When the user's action corresponding to the live challenge is not identified within a predetermined time, the processor 2120 according to the embodiment of the disclosure may deny the access to at least one application. In addition, when the user's action corresponding to the live challenge is identified within a predetermined time, the processor 2120 may permit the access to the at least one application.

The processor 2120 according to the embodiment of the disclosure may determine the actor and the task by using a predetermined learning network model, based on the context parameters.

The memory 2130 may store programs for processing and control in the processor 2120 and may store input or output data (for example, the live challenge or the context parameters).

The memory 2130 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. In addition, the electronic device 2100 may operate a web storage or a cloud server that performs the storage function of the memory 2130 on the Internet.

The embodiment of the disclosure may be implemented through at least one software program executing on at least one hardware device. The components or embodiments of the disclosure illustrated in FIGS. 1 to 21 may include a hardware device or a block that may be at least one of a combination of a hardware device and a software module.

It will be understood that the expression or terminology used herein is for the purpose of description and not limitation. Therefore, while the embodiments of the disclosure have been described with reference to exemplary embodiments, the embodiments of the disclosure may be carried out with modification within the scope of the technical idea of the disclosure.

The method according to the embodiment of the disclosure may be embodied as program commands that can be executed by various computing means and recorded on a non-transitory computer-readable recording medium. Examples of the non-transitory computer-readable recording medium may include program commands, data files, and data structures solely or in combination. The program commands recorded on the non-transitory computer-readable recording medium may be specifically designed and configured for the disclosure, or may be well known to and usable by one of ordinary skill in the field of computer software. Examples of the non-transitory computer-readable recording medium may include magnetic media (e.g., hard disk, floppy disk, magnetic tape, etc.), optical media (e.g., CD-ROM, DVD, etc.), magneto-optical media (e.g., floptical disk, etc.), ROM, RAM, and flash memory, which are configured to store program commands. Examples of the program commands may include not only machine language codes prepared by a compiler but also high-level codes executable by a computer by using an interpreter.

The device according to the embodiment of the disclosure may include a processor, a memory that stores and executes program data, a permanent storage such as a disk drive, a communication port that communicates with an external device, a user interface device such as a touch panel or a key, and the like. The methods implemented by software modules or algorithms may be stored in a non-transitory computer-readable recording medium as codes or program commands executable on the computer. Examples of the non-transitory computer-readable recording medium may include a magnetic storage medium (e.g., ROM, RAM, floppy disk, hard disk, etc.) and an optical recording medium (e.g., CD-ROM, digital versatile disc (DVD)). The non-transitory computer-readable recording medium may also be distributed over network-coupled computer systems so that the computer-readable code is stored and executed in a distributed fashion. The non-transitory computer-readable recording medium may be stored in the memory and may be executed by the processor.

In the disclosure, the term "computer program product" or "non-transitory computer-readable recording medium" is used to refer generally to a medium such as a memory, a hard disk installed in a hard disk drive, and a signal. The "computer program product" or the "non-transitory computer-readable recording medium" is an object for providing the computer system with software configured with instructions for performing the user authentication operation via provision of the live challenge according to the embodiment of the disclosure.

Although reference numerals are denoted in the embodiments of the disclosure illustrated in the drawings, and specific terms are used to describe the embodiments of the disclosure, the disclosure is not limited by any particular terms, and the embodiments of the disclosure may include all components that are commonly conceivable to those of skilled in the art.

The embodiment of the disclosure may be described in terms of functional block components and various processing operations. The functional blocks may be implemented by any number of hardware and/or software configurations that perform specific functions. For example, the embodiment of the disclosure may employ integrated circuit components such as memory, processing, logic, or look-up table, which may perform various functions by control of one or more microprocessors or by other control devices. In addition, the embodiment of the disclosure may employ different types of cores, different types of CPUs, or the like. The components of the disclosure are implemented using software programming or software elements. Similarly, the disclosure may be implemented with any programming or scripting language such as C, C++, Java, assembler, or the like, with the various algorithms being implemented with any combination of data structures, objects, processes, routines or other programming elements. The functional blocks may be implemented by algorithms that are executed on one or more processors. Furthermore, the embodiment of the disclosure may employ techniques according to the related art for electronic environment configuration, signal processing, and/or data processing. The terms "mechanism", "component", "means", and "configuration" may be used in a broad sense and are not limited to mechanical and physical configurations. The terms may include the meaning of a series of routines of software in conjunction with a processor or the like.

The particular executions shown and described herein are illustrative examples and are not intended to otherwise limit the scope of the disclosure in any way. For the sake of clarity, electronics according to the related art, control systems, software, and other functional aspects of the systems may not be described. Furthermore, the connecting lines or connecting members shown in the various figures are intended to represent exemplary functional relationships and/or physical or logical connections between the various elements. It should be noted that many alternative or additional functional relationships, physical connections or logical connections may be present in a practical apparatus. Moreover, no component is essential to the practice of the embodiments of the disclosure unless the component is specifically described as "essential" or "critical".

The use of the term "the" or a similar definite term in the specification (in particular, in the claims) is to be construed to cover both the singular and the plural. In addition, when a range is described in the embodiments of the disclosure, the embodiments of the disclosure to which individual values belonging to the range are applied may be included (unless otherwise indicated herein), and this is the same as that each of the individual values falling within the range is described in the detailed description of the disclosure. Finally, the steps of all methods described herein may be performed in any suitable order unless otherwise indicated herein or otherwise clearly contradicted by context. The embodiments of the disclosure are not limited by the order of the steps described herein. The use of all illustrations or illustrative terms (for example, and the like, etc.) in the embodiments of the disclosure is simply to describe the embodiment of the disclosure in detail, and the scope of the disclosure is not limited due to the illustrations or illustrative terms unless they are limited by claims. In addition, it will be understood by those of ordinary skill in the art that various modifications, combinations, and changes may be made according to design conditions and factors within the scope of the attached claims or the equivalents.

What is claimed is:

1. A method of authenticating a user, the method being performed by an electronic device and comprising:
    obtaining a user authentication request for access to at least one application that is executed on the electronic device;
    displaying a message asking whether to perform the authentication by using augmented reality (AR);

based on a user response to the displayed message, identifying whether to perform authentication using AR;

based on the user authentication request being obtained and an identification that authentication is to be performed using AR, selecting an object that is displayed in a field of view (FoV) of a camera included in the electronic device;

selecting an actor and a task constituting a live challenge for authentication, based on the selected object and one or more context parameters associated with the electronic device and/or the user, wherein the one or more context parameters indicating a situation of the electronic device and/or the user comprise an activity information that is performed in the electronic device by the user and a social network service (SNS) information;

displaying the live challenge for authentication, by displaying an AR image of the selected actor on the displayed object;

obtaining a touch input of the user for performing the displayed live challenge;

determining whether the touch input is on the displayed AR image and corresponds to the identified task; and based on the touch input being on the displayed AR image and corresponding to the identified task, identifying to grant access to the at least one application.

2. The method of claim 1, wherein the selecting of the actor and the task comprises:

selecting the actor corresponding to the selected object; and selecting the task capable of being performed by the selected actor, and wherein the displaying of the live challenge comprises displaying a question prompting the selected task.

3. The method of claim 1, wherein the displayed AR image is superimposed on the displayed object.

4. The method of claim 1, further comprising:

identifying movement information about the electronic device or the user after the object is selected; and wherein the outputting of the AR image comprises adjusting a location at which the AR image is displayed, based on the identified movement information.

5. The method of claim 1, further comprising identifying a location of the electronic device, wherein the object is identified around the electronic device, based on the identified location of the electronic device.

6. The method of claim 1, wherein the identifying to grant access to the at least one application comprises:

based on the touch input not being received within a predetermined time, denying the access to the at least one application; and based on the touch input being received within the predetermined time, identifying to grant the access to the at least one application.

7. The method of claim 1, wherein the one or more context parameters further comprise setting information about the electronic device, time information, a location at which the user authentication request is obtained, a notification that is obtained by the electronic device, surrounding environment information about the electronic device, a network to which the electronic device is connected, and a number of other electronic devices connected to the electronic device.

8. The method of claim 1, wherein the actor and the task are selected using a preset learning network model in which the selected object and the one or more context parameters are input.

9. An electronic device for performing user authentication, the electronic device comprising:

a memory storing instructions; and at least one processor connected to the memory, and configured to execute the instructions to:

obtain a user authentication request for access to at least one application that is executed on the electronic device;

display a message asking whether to perform the authentication by using augmented reality (AR);

based on a user response to the displayed message, identify whether to perform authentication using augmented AR;

based on the user authentication request being obtained and an identification that authentication is to be performed by using AR, select an object that is displayed in a field of view (FoV) of a camera included in the electronic device;

determine an actor and a task constituting a live challenge for authentication, based on the selected object and one or more context parameters associated with the electronic device and/or a user, wherein the one or more context parameters indicating a situation of the electronic device and/or the user comprise an activity information that is performed in the electronic device by the user and a social network service (SNS) information;

control a display to display the live challenge for authentication, by displaying an AR image of the selected actor on the displayed object;

obtain a touch input of the user for performing the displayed live challenge;

determine whether the touch input is on the displayed AR image and corresponds to the identified task; and based on the touch input being on the displayed AR image and corresponding to the identified task, identify to grant access to the at least one application.

10. The electronic device of claim 9, wherein the at least one processor is further configured to execute the instructions to:

select the actor corresponding to the selected object;

selected the task capable of being performed by the selected actor; and control the display to display a question prompting the selected task.

11. The electronic device of claim 9, wherein the displayed AR image is superimposed on the displayed object.

12. The electronic device of claim 9, further comprising a sensor configured to identify movement of the electronic device or the user, wherein the at least one processor is further configured to execute the instructions to:

identify movement information about the electronic device or the user after the object is selected, via the sensor; and adjust a location at which the AR image is displayed, based on the identified movement information.

13. The electronic device of claim 9, further comprising a sensor configured to identify a location of the electronic device, wherein the object is identified around the electronic device, based on the identified location of the electronic device.

14. The electronic device of claim 9, wherein the at least one processor is further configured to execute the instructions to:
- based on the touch input not being received within a predetermined time, deny the access to the at least one application; and
- based on the touch input being received within the predetermined time, identify to grant the access to the at least one application.

15. The electronic device of claim 9, wherein the one or more context parameters comprise setting information about the electronic device, time information, location at which the user authentication request is obtained, a notification that is obtained by the electronic device, surrounding environment information about the electronic device, a network to which the electronic device is connected, and a number of other electronic devices connected to the electronic device.

16. The electronic device of claim 9, wherein the actor and the task are selected using a preset learning network model in which the selected object and the one or more context parameters are input.

* * * * *